United States Patent [19]
Chen

[11] Patent Number: 5,533,009
[45] Date of Patent: Jul. 2, 1996

[54] BANDWIDTH MANAGEMENT AND ACCESS CONTROL FOR AN ATM NETWORK

[75] Inventor: Wai Chen, Randolph, N.J.

[73] Assignee: Bell Communications Research, Inc., Morristown, N.J.

[21] Appl. No.: 383,400

[22] Filed: Feb. 3, 1995

[51] Int. Cl.⁶ .................................................. H04L 12/54
[52] U.S. Cl. .......................... 370/17; 370/58.2; 370/60.1; 370/61; 370/79; 370/85.6; 340/825.51
[58] Field of Search ........................... 370/17, 58.2, 58.3, 370/60, 60.1, 61, 79, 94.1, 94.2, 85.6; 340/825.5, 825.51

[56] References Cited

U.S. PATENT DOCUMENTS

| | | | |
|---|---|---|---|
| 5,237,564 | 8/1993 | Lespagnol et al. | 370/60.1 |
| 5,271,004 | 12/1993 | Proctor et al. | 370/60 |
| 5,276,676 | 1/1994 | Horn et al. | 370/17 |
| 5,278,828 | 1/1994 | Chao | 370/85.6 |
| 5,280,475 | 1/1994 | Yanagi et al. | 370/60 |
| 5,313,579 | 5/1994 | Chao | 370/60 X |
| 5,390,184 | 2/1995 | Morris | 370/94.2 |

Primary Examiner—Douglas W. Olms
Assistant Examiner—Russell W. Blum
Attorney, Agent, or Firm—Leonard Charles Suchyta; James W. Falk

[57] ABSTRACT

A bandwidth management system manages a plurality of virtual data connections within a communications network. The system includes an input for receiving data cells, wherein each cell is associated with a particular one of the virtual connections. The system also includes a cell pool, coupled to the input for storing the cells, first and second queues for ordering the virtual connections, and an output for transmitting cells from the cell pool. The relative position of a virtual connection in the first queue is determined by an eligibility variable that varies according to an anticipated data rate associated with the particular virtual connection and according to an amount of time that the particular virtual connection has been in the first queue. The relative position of a virtual connection in the second queue varies according to a predetermined quality of service that is assigned to each of the virtual connections.

35 Claims, 9 Drawing Sheets

COMMUNICATION NODES 32-50

BANDWIDTH MANAGEMENT AND ACCESS CONTROL FOR AN ATM NETWORK

GOVERNMENT RIGHTS

This invention was made with Government support under Contract DABT63-93-C-0013 awarded by the Department of the Army. The Government has certain rights in the invention.

FIELD OF THE INVENTION

This invention relates to the field of asynchronous data communication and more particularly to the field of managing the flow rate of data through an asynchronous data communication network.

RELATED ART

The next generation public backbone network capable of supporting voice, video, image, data, and multi-media services is envisioned as a broadband Integrated Services Digital Network (ISDN) using an asynchronous transfer mode (ATM) to transmit data. The perceived advantages of ATM technology include flexibility and simplicity of asynchronously multiplexing traffic sources with a very broad range of source parameters and service quality requirements with information loss and delay performance ranging from close to that of the synchronous transfer mode to that of best-effort service in today's packet-switched networks. Broadband ISDN is therefore a promising network technology to support emerging needs of high performance computing and communications.

The major technical impediment to practical large scale deployment of ATM-based broadband ISDN networks, however, is the lack of practical real-time bandwidth management that will guarantee predictable end-to-end grades of service over a multi-node, multi-carrier network to end application platforms, such as high performance workstations and supercomputers.

In ATM-based broadband ISDN, information from the application layer is processed at the ATM Adaptation layer into fixed size ATM cells, which are in turn multiplexed/switched at the ATM layer, and transported in payload envelopes at the physical layer. Performance degradation caused by congestion due to insufficient network resources at certain parts of the network leads to perceptible performance degradation to the end-users, unless robust bandwidth management policies are defined and implemented. The overall objective of bandwidth management and traffic control of broadband ISDN is to provide consistent and predictable end-to-end performance, while at the same time optimizing network resource utilization for end-users with a wide range of performance requirements and traffic flows, including some which are very bursty.

The problem of bandwidth management and traffic control of broadband ISDN becomes complex due to factors such as the diversity of traffic flow characteristics (much of which is unknown even at the time of transmission), connection performance requirements, the impacts of end-to-end propagation delay and the processing delay at the network elements due to increased switching and transmission speeds. The very high speed of ATM networks coupled with propagation delay results in large numbers of ATM cells in route, while the (relatively) large cell processing time at intermediate nodes imposes severe limitations on intermediate node protocol processing. These factors cause existing traffic control approaches (like the X.25 data communications flow control designed for traditionally low-speed networks) to become ineffective. Hence new, robust (to cope with unknown and changing traffic characteristics), low-cost and scalable (to increasingly higher speeds) traffic control strategies are needed for Broadband ISDN.

The real-time (typically several milliseconds or less) traffic control requirements of broadband ISDN is drastically different from those of existing networks due to the factors discussed above. According to functionality, the real-time traffic control may consist of well-coordinated components such as access control, flow control, reactive congestion control, and error control. Access control, including connection admission control/bandwidth allocation, traffic shaping, and bandwidth enforcement, can achieve user objectives at the user-network interface. Other controls (flow control, reactive congestion control, error control) achieve destination buffer protection, network internal congestion handling, and information integrity guarantee, respectively.

The central goal of access control is to achieve, at the user-network interface, objectives such as predictable information throughput, connection blocking probability, cell loss ratio, and cell transfer delay/cell delay variation, among others. In view of uncertain and changing traffic characteristics/parameters and increased transmission/switching speeds in broadband ISDN, the access control mechanism should be robust, fast, scalable (from 155 to 622 Mbps, or higher), and low-cost to implement.

There are three related aspects of access control: connection admission control, bandwidth shaping and pacing, and bandwidth enforcement. Connection admission control decides connection acceptance, given traffic characteristics and performance requirements (e.g. peak rate, cell loss rate), based on the current network state. Generally, a decision needs to be made and network resources allocated in no more than a few seconds. Some key issues include what traffic descriptors should be used (i.e., peak data rate, average data rate, priority, burst length, etc), how to determine effective bandwidth of a bursty connection, how to predict performance (given underlying traffic shaping/bandwidth enforcement mechanisms), what acceptance/rejection criteria to use, and how fast can algorithms be executed.

Currently, different solutions for connection admission control exist, ranging from peak rate allocation (simple to implement, but bandwidth inefficient for variable bit-rate services) to more sophisticated algorithms which determine the "admissible acceptance region" in an N-service space. Typically, the connection admission control will be implemented in software, which makes it possible to start with a simple and robust algorithm during the early stages of broadband ISDN and yet allows evolution towards more sophisticated (and effective) algorithms as they become available.

A distinguishing feature of access control schemes is their capability to provide statistical multiplexing for variable bit rate services. A number of factors significantly impact the statistical multiplexing efficiency, including, among others, variable bit-rate transmission peak rate (relative to the link capacity) and the burst duration distribution. Studies have shown that pure statistical multiplexing of variable bit-rate connections may result in a low (e.g. 20–25%) network utilization, if no traffic shaping or resource allocation (such as the fast reservation protocol) techniques are used. By proper modification of the cell arrival process (i.e., traffic shaping), higher statistical multiplexing efficiency may be achieved. Such modification techniques employed by the pacing mechanism may include cell jitter smoothing, peak cell rate reduction, message burst length limiting, and service scheduling of variable bit rate virtual circuit connections (VC's), among others.

Further, traffic shaping may possibly be used in conjunction with a network bandwidth enforcement mechanism by rescheduling a cell's service (in addition to cell discarding or tagging) when a non-compliant cell is observed. For non-delay sensitive but loss sensitive variable bit rate services, this option is appealing in order to minimize the cell loss ratio. However, applicability of pacing techniques to cells with stringent delay requirement (such as interactive variable bit rate video) requires further study. From a network operation point of view, source shaping/pacing is also desirable to prevent overwhelming the system with more data than the system can handle.

The purpose of network bandwidth enforcement is to monitor a connection's bandwidth usage for compliance with appropriate bandwidth limits and to impose a policing action on observed violations of those limits. The enforcement control works on the time scale of a cell emission time, (i.e., about 2.7 μsec for 155 Mb/s service or about 0.7 μsec for 622 MB/s service). Key issues of bandwidth enforcement include the design of the monitoring algorithm and policing actions to be taken on non-compliant cells. Other issues include handling of traffic parameter value uncertainty, the effectiveness in terms of the percentage of erroneous police actions upon compliant cells and the percentage of non-compliant cells undetected, and the detection time of a given violation.

The bandwidth enforcement mechanism operates upon network-measured traffic parameter values, which may include a connection's peak cell rate, its average cell rate, and its peak burst length. Currently, a few bandwidth enforcement algorithms have been proposed using, for example, single or dual leaky buckets, jumping, or sliding windows. However, some studies have shown that the leaky-bucket algorithms, using peak/average rates and average burst length, may still not be robust enough for various variable bit rate traffic mixes. The studies also show that the leaky-bucket algorithms also tend to complicate performance prediction at the connection admission control level. Furthermore, accurate estimation of average cell rate and burst length by users may be very difficult in practice. This suggests the need for the exploration of alternative approaches to this problem, in order to bring about an early deployment of broadband ISDN.

A number of access control approaches have been proposed, but there is no standard consensus among the vendor and research communities. An approach has been proposed that accepts connections based on bandwidth pools dedicated to several traffic classes respectively and uses a leaky bucket type algorithm for monitoring connection bandwidth utilization with immediate cell discarding of non-compliant cells. Another proposal also uses a leaky bucket type monitoring algorithm with tagging of non-compliant cells for possible later cell discarding. Another proposed approach uses a rate-based time window approach.

One study has indicated that the leaky bucket algorithm is superior to the time-window based approaches under certain traffic patterns studies. However, the same study also revealed difficultly in its dimensioning (e.g., the counter limit). Further, the performance of the leaky bucket algorithm is also found to be far below optimal, in terms of non-compliant cell detection and false alarms (the long term probability of declaring a bandwidth violation for compliant cells).

This seems to indicate that enforcement and pacing near the average cell rate for variable bit-rate services are much more complex than that has been generally recognized. For example, enforcement of a variable bit-rate traffic stream near the average rate generally leads to enormous buffer requirements (hence unacceptable response time) in order to keep the false alarm rate to an acceptable level (say $10^{-7}$).

More importantly, the effectiveness of a monitoring algorithm (such as the leaky bucket) is critically dependent on the source model behavior which is unknown for many applications and is difficult to estimate accurately at the time that the connection is made. Other reservation based schemes are more suitable for data traffic, but their performance characteristics have not been fully evaluated.

SUMMARY OF THE INVENTION

According to the present invention, a bandwidth management system manages a plurality of virtual data connections within a communications network. The system includes an input for receiving data cells, wherein each cell is associated with a particular one of the virtual connections. The system also includes a cell pool, coupled to the input, for storing the cells, a first and second queue for ordering the virtual connections, and an output for transmitting cells from the cell pool. The relative position of a virtual connection in the first queue is determined by an eligibility variable that varies according to an anticipated data rate associated with the particular virtual connection and according to an amount of time that the particular virtual connection has been in the first queue. The relative position of a virtual connection in the second queue varies according to a predetermined quality of service that is assigned to each of the virtual connections. The output transmits a cell from the cell pool corresponding to a virtual connection at the front of the second queue.

Virtual connections having eligibility variables with equal values can be ordered in the first queue according to the predetermined quality of service. The system can use four different values for quality of service. Virtual connections having equal quality of service values can be ordered in the second queue according to a priority computed for each of the virtual connections. Credit variables for each virtual connection can indicate allocated time slots provided to each of the virtual connections. The priority can vary according to one or more of: one or more anticipated data rates of each of the virtual connections, the value of one or more of the credit variables, and the number of backlogged cells that are awaiting transmission. The data rates, credit variables, and backlog values can be weighted prior to determining the priority. The system can use a burst bit indicator to determine if virtual connections associated with cells received at the input should be placed immediately on the second queue.

The bandwidth management system can be one of: a pacing unit and an enforcement unit. A pacing unit receives cells from a data source node and provides cells to a communication link. An enforcement unit receives data from a communication link and provides data to a data sink node. A virtual connection can be established by specifying initially agreed-upon traffic parameters and dropping cells that are received at a rate that exceeds that specified by the initial traffic parameters.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
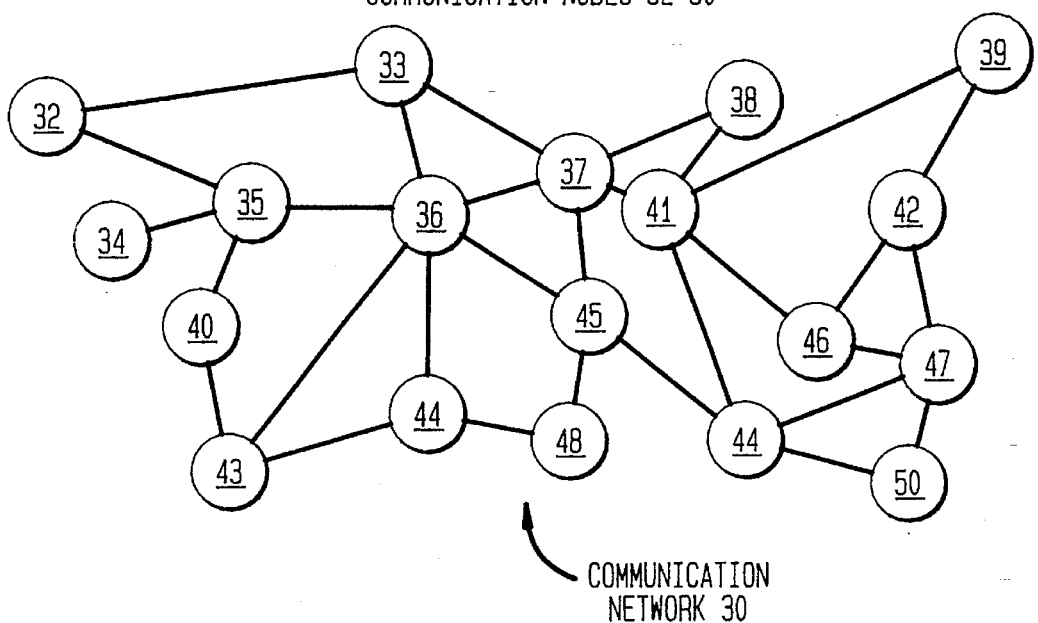
FIG. 1 shows a data communications network having a plurality of physically interconnected nodes.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring to FIG. 1, a communications network 30 comprises a plurality of communication nodes 32–50 that are physically interconnected. Each of the nodes 32–50 represents conventional communications equipment for sending and receiving communications data. The lines drawn between the nodes 32–50 represent physical communications links for transmitting data between the nodes 32–50. The communications links can be any one of a plurality of conventional mediums for communication data transmission including fiber optics, twisted pair, microwaves links, etc.

It is possible for two nodes to be directly connected to each other, which facilitates communication between the directly connected nodes. For example, the node 34 is shown in FIG. 1 as being directly connected to the node 35. Accordingly, communications between the node 34 and the node 35 is facilitated via the direct physical communication link.

Often, it is desirable to communicate between two nodes which are not directly connected via a single physical communication link. For example, it may be desirable to send data from the node 34 to the node 49 of FIG. 1. In that case, communication is facilitated by passing messages through intermediate nodes between the node 34 and the node 49. Data from the node 34 to the node 49 can be sent by first transmitting the data from the node 34 to the node 35, then from the node 35 to the node 36, then from the node 36 to the node 45, and finally from the node 45 to the node 49.

In the example above, a "virtual connection" between the node 34 and the node 49 is established to facilitate communication between the nodes 34, 49 and to establish desired quality of service for the communication. A virtual connection is established between two nodes when one of the nodes has data that is to be sent to another node. A virtual connection can be terminated after all of the data has been sent. For example, if the node 34 represents a user computer terminal and the node 49 represents a mainframe computer, then a virtual connection can be established between the node 34 (terminal) and the node 49 (mainframe) whenever a user logs on to the computer system. The virtual connection could then be terminated when the user logs off the system.

Figure 2:
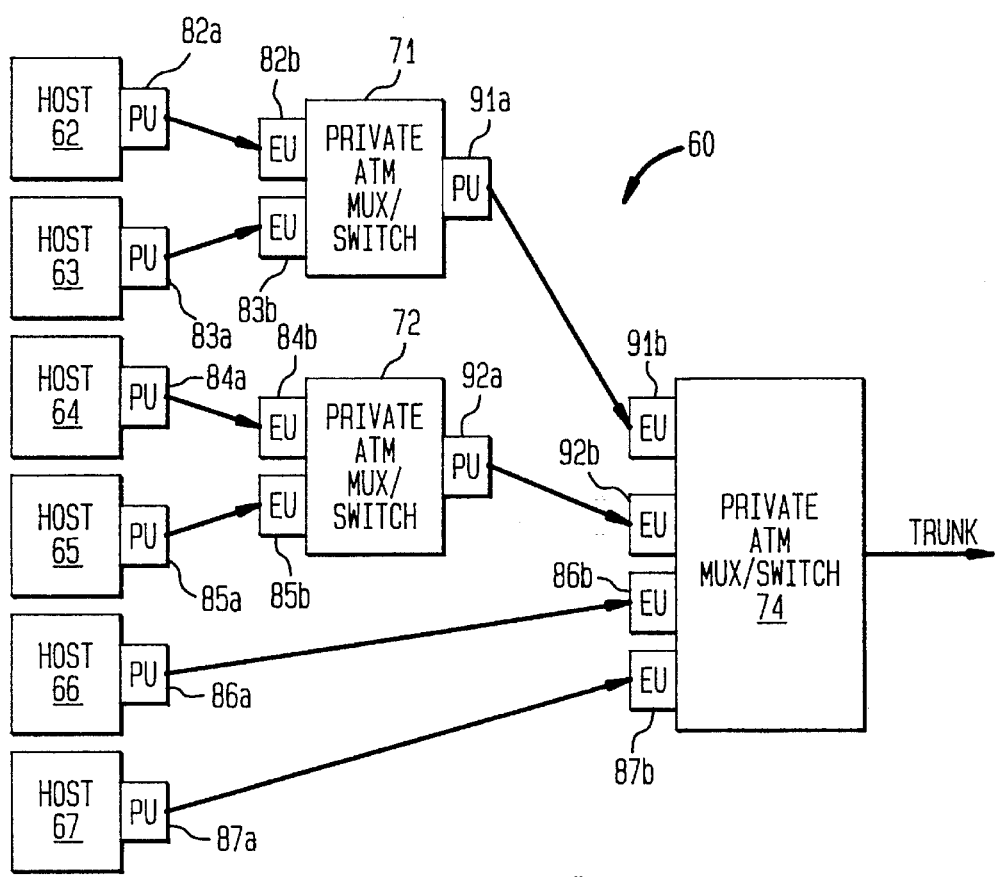
FIG. 2 shows a plurality of communication nodes interconnected by a plurality of virtual connections.

Referring to FIG. 2, a schematic diagram 60 shows a plurality of hosts 62–67, a pair of private ATM (asynchronous transfer mode) mux/switches 71, 72, and a public ATM mux/switch 74. Each of the hosts 62–67 represents one of a plurality of possible sources of data, such as a telephone, a fax machine, a computer terminal, a video teleconference terminal, etc. The host 62 transmits data to the private ATM mux/switch 71 via a virtual connection set up between the host 62 and the private ATM mux/switch 71. The host 63 transmits data to the mux/switch 71 via a second virtual connection between the host 63 and the private ATM mux/switch 71. A virtual connection can span a single direct physical link or can span a plurality of consecutive physical connections through intermediate network nodes, not shown in FIG. 2. Similarly, the host 64, 65 are connected to the mux/switch 72 via separate virtual connections therebetween. The mux/switches 71, 72 and the hosts 66, 67 are connected to the public ATM mux/switch 74 via additional virtual connections. The public ATM mux/switch 74 provides data to a trunk (not shown).

The diagram 60 shows a general flow of data from the hosts 62–67 to the trunk via the intermediate devices 71, 72, 74. The virtual connections shown in the diagram 60 are set up at the time that the hosts 62–67 begin transmitting data. For example, if the host 62 represents a telephone, then a virtual connection between the host 62 and the private ATM mux/switch 71 can be established by a connection admission procedure when the user picks up the handset of the telephone and begins dialing. The virtual connection can be terminated when the user hangs up the telephone.

In order to avoid exceeding the data-handling capacity of either the trunk, the switches 71, 72, 74 or the links therebetween, it is desirable to control the amount of data that flows from the hosts 62–67 to the switches 71, 72, 74 and to control the amount of data that flows from the switches 71, 72, 74 to the trunk. Accordingly, each output port of the hosts 62–67 is provided with one of a plurality of pacing units 82a–87a. The pacing unit 82a is connected to the output port of the host 62, the pacing unit 83a is connected to the output port of the host 63, etc.

The pacing units 82a–87a control the data transmitted from the hosts 62–67 by limiting all data transmitted on the associated connection. For example, the pacing unit 82a limits data transmitted from the host 62 to the private ATM mux/switch 71. Data is first passed from the host 62 to the pacing unit 82a via the output port of the host 62. The pacing unit 82a then provides the data to the communication link.

The pacing unit 82a provides the data on the communication link at an agreed upon rate, as described in more detail hereinafter. Note that the switches 71, 72 also transmit data via pacing units 91a, 92a connected to the output ports thereof.

Associated with each of the pacing units 82a–87a, 91a, 92a are corresponding enforcement units 82b–87b, 91b, 92b. The enforcement units 82b–87b, 91b, 92b are at the receiving ends of the communication links to ensure that the agreed upon data rate of each of the connections is maintained. The enforcement units 82b–87b, 91b, 92b are connected to input ports of corresponding devices so that, for example, the enforcement unit 82b is connected to the input port of the mux/switch 71. If a pacing unit provides data at greater than the agreed upon data rate, the corresponding enforcement unit discards the excess data. Pacing units are provided at data source nodes while enforcement units are provided at data sink (i.e., receiving) nodes.

When a virtual connection is established between two nodes, the pacing unit at the data source node and the enforcement unit at the data sink node initially agree upon a data rate and a quality of service. Quality of service relates to a variety of characteristics, including the acceptable delay between generation and reception of the data, as described in more detail hereinafter. The requested data rate and quality of service are functions of the type of data being sent. For example, real time voice data may require a different data rate than would real time video data, but both may require a relatively high quality of service. In contrast, an E-Mail message would probably require a relatively low quality of service.

During initialization of the virtual connection, a pacing unit requests an appropriate set of traffic parameters (such as data rate, buffer space, etc.) and requests the desired quality of service. The corresponding enforcement unit at the other end of the virtual connection can accept or deny the request of the pacing unit. A request is denied if the node to which the enforcement unit is attached is not capable of handling the requested amount of data to meet the requested quality of service. Reasons for denying the request include insufficient capacity of the data sink node to handle the requested data rate and insufficient capacity of the communications link to handle the requested data rate. If the request is denied by the enforcement unit, then the virtual connection is not established. Assuming however that the request is accepted, the virtual connection between the nodes is established. Once established, the pacing unit operates so as to send data according to the initially agreed upon traffic parameters.

Data is communicated over the communications links via packets or fixed-size ATM cells. Each cell contains one or more bytes of digital data along with header information identifying the virtual connection and other appropriate information, discussed in detail hereinafter. Note that, for the network shown in FIG. 2, data rate limiting all of the connections between the nodes will, of necessity, limit the total amount of data that is provided to the trunk. Accordingly, the pacing units 82a–87a, 91a, 92a and enforcement units 82b–87b, 91b, 92b can be used to prevent the trunk, and hence the network, from being overloaded with too much data.

The pacing and enforcement units receive cells at their respective inputs and transmit cells from their respective outputs. The operation of each is substantially identical. Accordingly, the detailed discussion which follows is equally applicable both types of units which are referred to generically as bandwidth management units.

Figure 3:
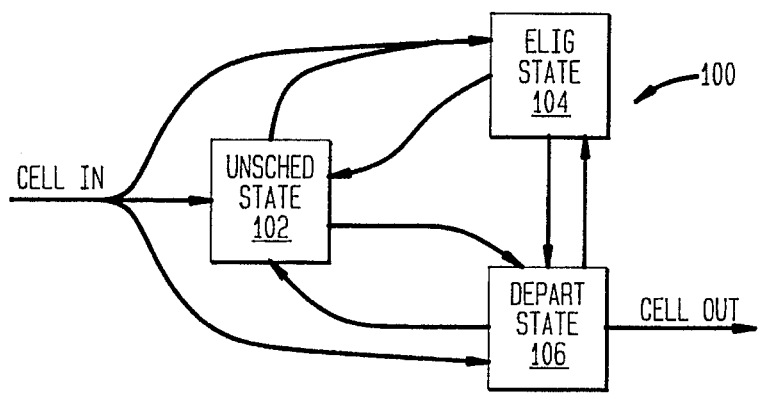
FIG. 3 is a data flow diagram showing different states of data within a bandwidth management unit according to the present invention.

Referring to FIG. 3, a data flow diagram 100 illustrates different states of a virtual connection handled by a bandwidth management unit. Note that a single bandwidth management unit can handle multiple virtual connections even though the bandwidth management unit is physically connected to only a single transmission link. The node to which the bandwidth management unit is connected sends or receives cells for the various connections and the bandwidth management unit outputs the cells in a particular order.

Initially, a cell is provided to the bandwidth management unit from either the output port of the associated data source node (for a pacing unit) or from the communication link (for an enforcement unit). The associated virtual connection (VC) begins in an unscheduled state 102. A cell corresponding to a VC in the unscheduled state 102 is deemed not to be ready to transmit by the bandwidth management unit.

The VC transitions out of the unscheduled state 102 by becoming eligible and having at least one data cell ready to transmit. Eligibility of a VC is controlled externally by the data node connected to the bandwidth management unit in a manner described in more detail hereinafter. A VC which is deemed immediately eligible by the data node will transfer out of the unscheduled state 102.

The VC can transition from the unscheduled state 102 to an eligibility state 104. The eligibility state 104 indicates that the cells associated with the VC are waiting to become eligible for output, but the VC is waiting for particular conditions to be met, which are described in more detail hereinafter.

When the conditions are met, the VC can transition from the eligibility state 104 to a departure state 106. A VC in the departure state 106 has at least one cell associated therewith which is ready to be output by the bandwidth management unit. The cells of the VC in the departure state are transmitted by the bandwidth management unit in a specific order, as described in more detail hereinafter.

A VC which is in the eligibility state 104 or in the departure state 106 can be transitioned back to the unscheduled state 102 when the data node connected to the bandwidth management unit deems the VC to be ineligible or when other conditions, described in more detail hereinafter, are met. Furthermore, it is possible for a VC in the departure state 106 to be transitioned back to the eligibility state 104 under certain conditions, also described in detail hereinafter. Under certain other conditions, a VC in the unscheduled state 102 can transition directly to the departure state 106 without going through the eligibility state 104. Transitions between various states and the conditions therefor are described in more detail hereinafter.

The ordering of the VC's in a queue associated with the departure state 106 is a function of the Quality of Service (QOS) of the virtual connection. The QOS of a virtual connection is established when the virtual connection is initialized by the data source node. The source node for the data can request one of four possible values for the QOS: high level QOS, mid level QOS, low level QOS, and best effort QOS. High level QOS is for real time traffic that requires bounded delay and virtually no cell loss. Mid level QOS is for real time traffic that requires bounded delay and little cell loss. Low level QOS is for delay-tolerant data traffic having controllable cell loss. Best effort QOS is for data which can be transmitted at a very low rate that can share available bandwidth not being used by the high level, mid level, and low level QOS cells. The ordering of the cells in the queue is based on the QOS associated with the virtual connection and upon other parameters which are discussed in detail hereinafter. Note that, although the invention is illustrated herein with four separate levels for the QOS, the invention can be practiced with a different number of levels. The number of levels chosen for the implementation is a design choice based on a variety of functional factors known to one of ordinary skill in the art.

Figure 4:
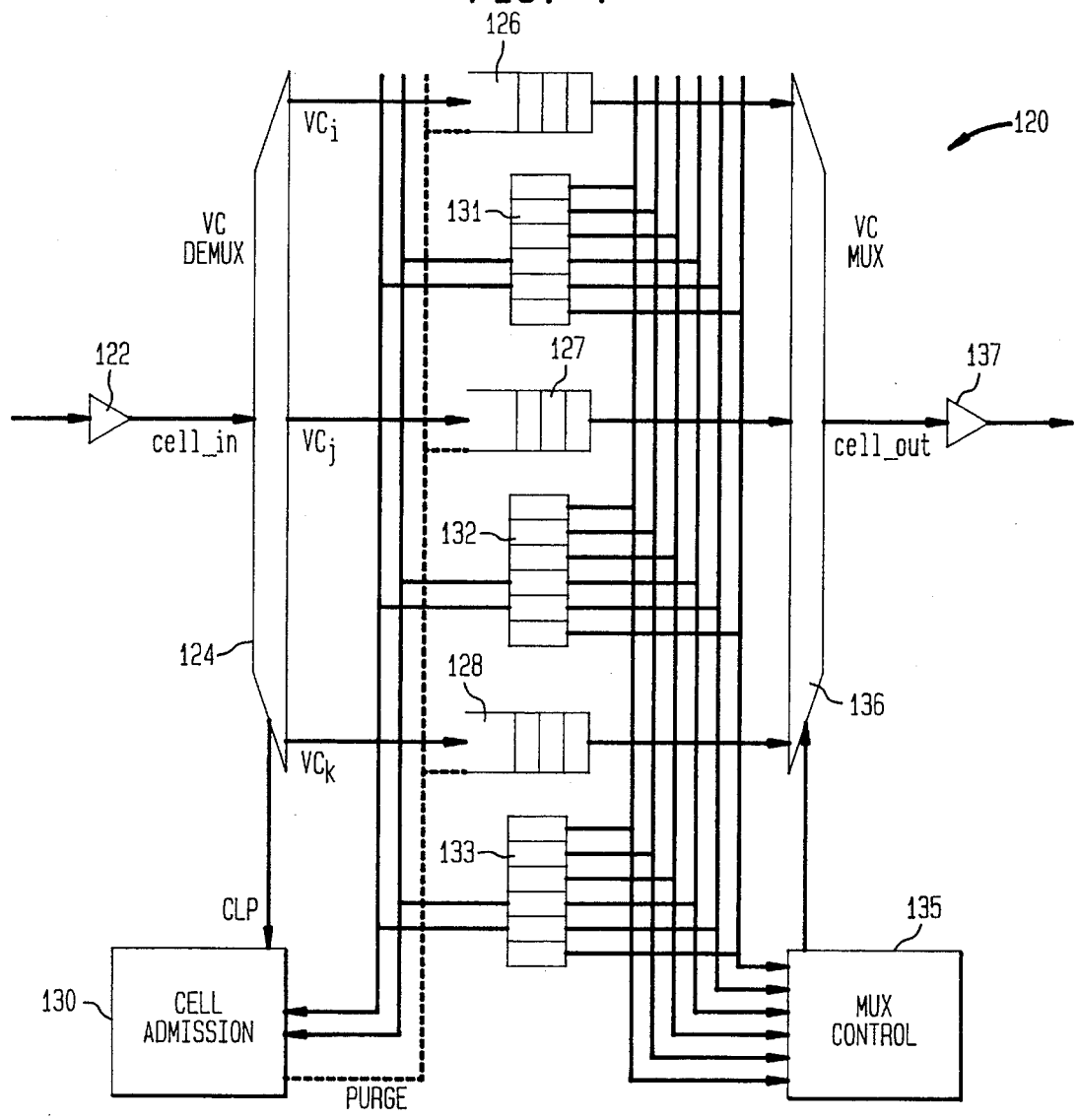
FIG. 4 is a functional block diagram of a bandwidth management unit according to the present invention.

Referring to FIG. 4, a schematic diagram 120 functionally illustrates operation of a bandwidth management unit. An input 122 accepts cells from a data node (not shown) connected to the bandwidth management unit. The cells that are received are provided to a demultiplexer 124. The demultiplexer 124 separates the input cells according to the VC associated therewith and places the cells in one of a plurality of appropriate queues 126–128, so that, for example, cells associated with virtual connection $VC_i$ are placed in the queue 126, cells associated with virtual connection $VC_j$ are placed in the queue 127 and cells associated the virtual connection $VC_k$ are placed in the queue 128. A cell admission unit 130 controls placing the cells in the queues 126–128 in a manner described in more detail hereinafter.

Associated with each virtual connection, $V_i$, $VC_j$, and $VC_k$, is a set of variables 131–133 that controls when the cells for each of the VC's will be transmitted out of the bandwidth management unit. Also when a cell is input to the bandwidth management unit, the cell admission unit 130 examines the variables 131–133, to determine if the cell should be admitted. As shown in FIG. 4, the virtual connection $VC_i$ has the variable set 131 associated therewith, the virtual connection $VC_j$ has the variable set 132 associated therewith, and the virtual connection $VC_k$ has the variable set 133 associated therewith. The variable sets 131–133 are described in more detail here and after.

The variable sets 131–133 are provided as inputs to a mux control 135 which controls which cell from the head of one of the queues 126–128 is next to be transmitted out of the bandwidth management unit. A multiplexor 136 is connected to each of the queues 126–128 and, in conjunction with the mux control 135, provides a cell from one of the queues 126–128 to an output 137 for transmission out of the bandwidth management unit. The table below facilitates the discussion which follows by showing parameters that are used for each virtual connection of the bandwidth management unit:

| VARIABLE NAME | DESCRIPTION |
| --- | --- |
| $scd_i$ | state of $VC_i$ |
| $qos_i$ | quality of service for $VC_i$ |
| $e_i$ | indicates if transmission for $VC_i$ is enabled |
| $s_i$ | eligibility timer for $VC_i$ |
| $r_i1$ | first rate variable for $VC_i$ |
| $r_i2$ | second rate variable for $VC_i$ |
| $c_i1$ | first credit variable for $VC_i$ |
| $c_i2$ | second credit variable for $VC_i$ |
| | number of backlogged cells for $VC_i$ |
| $w_i1$ | first weight variable for $VC_i$ |
| $w_i2$ | second weight variable for $VC_i$ |
| $w_i3$ | third weight variable for $VC_i$ |
| $w_i4$ | fourth weight variable for $VC_i$ |
| $w_i5$ | fifth weight variable for $VC_i$ |
| $b_i$ | burst bit indicator for $VC_i$ |
| $P_i$ | priority variable for $VC_i$ |

Figure 5:
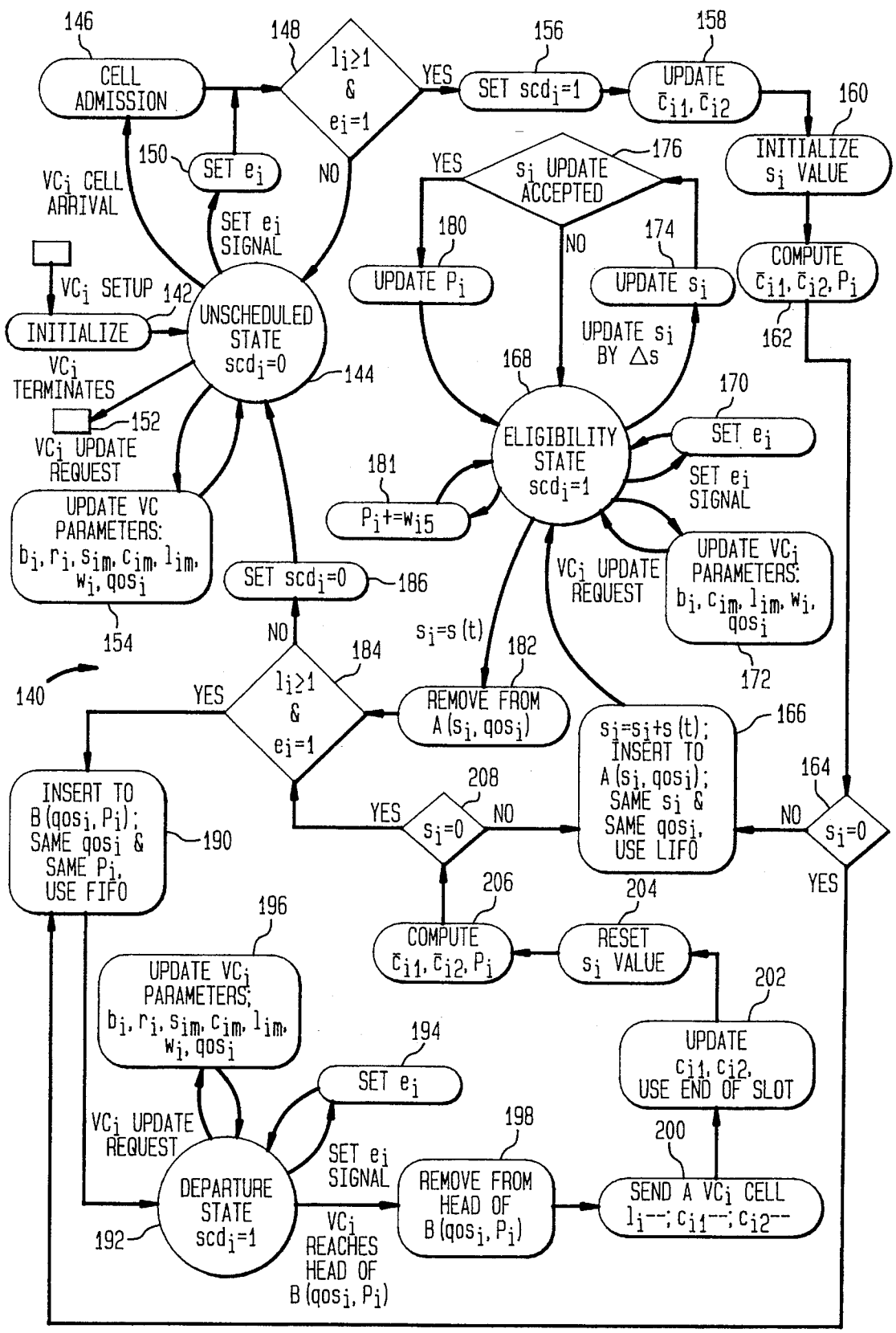
FIG. 5 is a state diagram showing operation of a bandwidth management unit according to the present invention.

Referring to FIG. 5, a state diagram 140 illustrates operation of a bandwidth management unit. Although operation is illustrated with regard to a single VC, $V_i$, the operation of other VC's of the bandwidth management unit is identical.

Circles on the diagram 140 show the three possible states of $V_i$: the unscheduled state, the eligibility state, and the departure state. A VC is always in one of those three states, although for a bandwidth management unit servicing multiple VC's, the state of any one of the VC's is independent of the state of any of the other VC's. The state diagram 140 also shows rectangles having rounded corners which represent operations performed by the bandwidth management unit with respect to $VC_i$. Diamonds on the diagram show decision branches where the flow is conditioned upon a particular variable or variables associated with $VC_i$ being in a particular state or having a particular value or values. The arrows between the various circles, rounded rectangles, and diamonds illustrate the flow through the state diagram. For an arrow having an annotation associated therewith, the annotation indicates the condition causing the transition from one portion of the state diagram 140 to another. Arrows having no annotation associated therewith represent an unconditional flow from one portion of the state diagram 140 to another.

Flow begins at an initial step 142 where $VC_i$ is initialized. Initialization of a VC includes having a pacing unit request a particular set of traffic parameters and quality of service (QOS) from the associated enforcement unit (i.e., the enforcement unit at the other end of the communication link). That is, $VC_i$ is initialized when the pacing unit sends a command to the associated enforcement unit requesting creation of $VC_i$ and specifying the set of traffic parameters and QOS for $VC_i$. As discussed above, the enforcement unit either accepts or rejects the request depending on the existing data loading on both the communication link and the receiving node. The decision is based on the loading for the node attached to the enforcement unit. If the request from the pacing unit to the enforcement unit is denied, then $VC_i$ is not initialized and no processing (i.e., no data transmission) occurs for $VC_i$.

Assuming that the $VC_i$ initialization request is approved by the enforcement unit, then following the initialization step 142, $VC_i$ enters an unscheduled state 144. While $VC_i$ is in the unscheduled state 144, the variable $scd_i$ is set to zero. $VC_i$ remains in the unscheduled state 144 until the first cell of data for $VC_i$ is received by the bandwidth management unit.

When a cell associated with $VC_i$ arrives, the bandwidth management unit transitions from the unscheduled state 144 to a cell admission step 146, where the cell is either accepted or rejected by the bandwidth management unit. The cell admission step 146 is described in more detail hereinafter.

Following the cell admission step 146 is a test step 148 which determines whether the $VC_i$ transitions from the unscheduled state 144 to another state. At the test step 148, the variables $1_i$ and $e_i$ are examined. The variable $1_i$ represents the backlog, in number of cells, for $VC_i$. That is, $1_i$ equals the number of cells received by the bandwidth management unit for $VC_i$ that have not been output by the bandwidth management unit. The variable $e_i$ is a variable indicating whether $VC_i$ has been enabled by the data node that is being serviced by the bandwidth management unit. That is, the data node that is connected to the bandwidth management unit can either enable or disable $VC_i$. For a virtual connections that is not enabled, the bandwidth management unit receives inputted cells but does not output the cells.

At the test step 148, it is determined if the backlog of cells for $VC_i$ is at least one (i.e., there is at least one cell associated with $VC_i$ stored in the bandwidth management unit) and if $VC_i$ is enabled. If one or both of those conditions are not met, then $VC_i$ returns to the unscheduled state 144.

Note also that while in the unscheduled state 144, it is possible for the bandwidth management unit to receive a signal from the data source node requesting that $e_i$ be set. In that case, control transfers from the unscheduled state 144 to a step 150 where $e_i$ is set. Following the step 150 is the test step 148, discussed above. Note, therefore, that it is possible for the bandwidth management unit to receive one or more cells for $VC_i$ prior to $VC_i$ being enabled and then for the bandwidth management unit to receive an enable signal from the data node so that $VC_i$ transitions from the unscheduled state 144.

While in the unscheduled state 144, it is possible for the bandwidth management unit to receive a signal from the data node requesting termination of $VC_i$. Termination can occur for a variety of reasons, including there being no more data to transmit over the virtual connection. In that case, control transfers from the unscheduled state 144 to a step 152 where $VC_i$ is terminated. Once $VC_i$ has been terminated, the bandwidth management unit does no further processing for $VC_i$ and accepts no more cells for transmission via $VC_i$.

It is also possible that, while in the unscheduled state 144, the bandwidth management unit receives a request from the data node to update parameters associated with $VC_i$. In that case, control transfers from the step 144 to a step 154 where the parameters associated with $VC_i$ are modified. The parameters that can be associated with $VC_i$ are discussed elsewhere herein. Note, however, that one of the parameters that can be updated at the step 154 is the quality of service associated with the $VC_i$, $qos_i$. That is, the data node can request that the quality of service associated with $VC_i$ be changed to a second value after the $VC_i$ has been initialized with a $qos_i$ having a first value. Following the update step 154, $VC_i$ returns to the unscheduled state 144.

If at the test step 148 it is determined that the backlog for the $VC_i$ is at least one (i.e., $1_i$ is greater than or equal to one) and that $VC_i$ is enabled (i.e., $e_i$ equals one), then control transfers from the step 148 to a step 156 where $scd_i$ is set to one. The $scd_i$ variable associated with $VC_i$ equals zero when the $VC_i$ is in the unscheduled state and equals one when $VC_i$ is in any of the other states.

Following the step 156 is a step 158 where the credit variables associated with $VC_i$, $c_i1$ and $c_i2$, are updated. The credit variables, $c_i1$ and $c_i2$, represent the amount of transmission channel bandwidth "credited" to $VC_i$. The credit variables are described in more detail hereinafter.

Following the step 158 is a step 160 where the value of $s_i$ is initialized. The value of $s_i$ represented the amount of elapsed time that $VC_i$ is to spend in the eligibility queue before transitioning to the departure queue. That is, after exiting from the unscheduled state, $VC_i$ is placed in the eligibility queue until an amount of time indicated by $s_i$ has elapsed, after which $VC_i$ is moved from the eligibility queue to the departure queue for output by the bandwidth management unit. The initial value of $s_i$ is determined by the associated data node and varies according to the initial traffic parameters specified when $VC_i$ is initialized.

Following the step 160 is a step 162 where the estimated values of the credits, $\bar{c}_i1$ and $\bar{c}_i2$ and the estimated value of the priority, $\bar{P}_i$, associated with $VC_i$ are computed. The priority, $P_i$, is used to order the VC's in the departure queue. Computing the priority is described in more detail hereinafter.

Following the step 162 is a test step 164 which determines if $s_i$ was set to zero at the step 160. As discussed above, a VC initializes $s_i$ according to values of the initial traffic parameters and the credits. If $s_i$ is set to zero at the step 160, then $VC_i$ is placed immediately on the departure queue. Otherwise, $VC_i$ is placed in the eligibility queue for an amount of time represented by the initial setting of $s_i$ provided at the step 160.

If at the test step 164 it is determined that $s_i$ does not equal zero, then control passes from the test step 164 to a step 166 where the value of $s_i$ is incremented by s(t). The quantity s(t) varies according to elapsed system time and is updated every cycle that the bandwidth management unit software is executed. In other words, the quantity s(t) varies according to the value of a real time system clock. Since $s_i$ is set at the step 160 to represent the amount of time $VC_i$ remains on the eligibility queue, then adding the present value of s(t) to $s_i$ sets the value of $s_i$ to the value that s(t) will equal when $VC_i$ is to be moved from the eligibility queue to the departure queue. For example, assume that the bandwidth management unit runs once every microsecond and that s(t) is incremented once every cycle. Further assume that a cell corresponding to a particular VC has been admitted and that the VC is to be moved from the eligibility queue to the departure queue in one hundred microseconds. Accordingly, the value of $s_i$ will be set to one hundred at the step 160. At the step 166, the present value of s(t) is added to one hundred in order to provide a value of $s_i$ that is tested against the real time clock so as to determine when to move the VC from the eligibility queue to the departure queue.

Also at the step 166, $VC_i$ is placed in the eligibility queue. For purposes of the state diagram 140, the eligibility queue is referred to as the "A" queue. The VC's in the eligibility queue are sorted by the value of s for each of the VC's and by the value of the quality of service for each of the VC's. In other words, the VC with the lowest value for s is at the head of the queue, the VC with the second lowest value for s is second in the queue, etc. For VC's that have the same value of s, the VC with the highest QOS is first, the VC with the second highest QOS is second, and so forth. If two or more VC's have an identical value for both s and QOS, then the VC's are sorted in the queue in a last in first out order. The significance of the order in the cells in the eligibility queue is discussed in detail hereinafter.

Following the step 166, $VC_i$ enters the eligibility state at a step 168. Note that $scd_i$ is set to one at the step 168.

From the eligibility state 168, it is possible for $VC_i$ to transition to a step 170, which sets $e_i$ to either one or zero according to an enable or disable command provided by the node attached to the bandwidth management unit. Note that after setting $e_i$ at the step 170, $VC_i$ returns to the eligibility state 168 without performing any further tests on the value of %. The value of $e_i$ is tested at a later point in the processing (discussed below), at which time $VC_i$ is returned to the unscheduled state if $e_i$ does not equal one. The bandwidth management unit can receive a request to update $VC_i$, in which case control transfers from the eligibility state 168 to a step 172 where the $VC_i$ parameters are updated. Following the step 172, the bandwidth management unit returns to the unscheduled state 168.

It is also possible for the bandwidth management unit to receive a command, while in the eligibility state 168, to update $s_i$ for $VC_i$. When this occurs, $VC_i$ transitions to a step 174 where the value of $s_i$ is updated. Following the step 174 is a test step 176 which determines if the update of $s_i$ has been accepted. If not, then control passes form the step 176 back to the eligibility state 168. Otherwise, the system transitions from the step 176 to a step 180 where the priority variable, $P_i$, is updated. Following the step 180, $VC_i$ returns to the eligibility state 168.

Whenever $VC_i$ is in the eligibility state 168 and a new cell for $VC_i$ arrives, control transfers to a step 181 where the priority for $VC_i$, $P_i$, is updated. Calculating and updating $P_i$ is described in more detail hereinafter.

Every cycle that the bandwidth management unit runs, the first N VC's at the head of the queue are tested to determine if $s(t) \geq s_i$. N is a predetermined constant value, such as eight. When the value of $s(t)$ is greater than or equal to the value of $s_i$, then the system transitions from the eligibility state 168 to a step 182 where $VC_i$ is removed from the eligibility queue (i.e., the "A" queue). Following the step 182 is a test step 184 which determines if the backlog for the $VC_i$ is at least one (i.e., $1_i \geq$ one) and if $VC_i$ is enabled (i.e., $e_i$=one). Note that it is possible for $VC_i$ to have become disabled while in the eligibility state 168 if the bandwidth management unit received a signal to set $e_i$ to zero at the step 170, discussed above.

If at the test step 184 it is determined that the backlog does not contain at least one cell or that $VC_i$ is disabled, then control passes from the test step 184 to a step 186 where $scd_i$ is set to zero. Following the step 186, $VC_i$ returns to the unscheduled state 144, and waits for either a cell admission or a signal to set $e_i$ to one, as described above in connection with the description of the steps 146, 150. If at the step 184 it is determined that the backlog of cells is at least one and that $VC_i$ is enabled, then control passes from the step 184 to a step 190 where $VC_i$ is placed in the departure queue, designated as the "B" queue on the state diagram 140. Note that the step 190 also follows the step 164, discussed above, when it is determined at the test step 164 that $s_i$ equals zero.

The VC's in the departure queue are sorted primarily in order of the quality of service (QOS) for the VC's. That is, VC's with higher requested quality of service are ahead of VC's with lower requested qualities of service. VC's in the queue having the same quality of service are sorted in order of priority, P. VC's having both the same quality of service and the same value for priority are sorted in a first in first out basis. Following the step 190, $VC_i$ enters a departure state 192.

While in the departure state 192, $VC_i$ can receive signals to set $e_i$ and update the parameters of $VC_i$. Setting $e_i$ is performed at a step 194 and updating the parameters for $VC_i$ is performed at a step 196. The steps 194, 196 are analogous to the steps 170, 172 discussed above in connection with the eligibility state 168. Note that following either the step 194 or the step 196, $VC_i$ returns to the departure state 192.

$VC_i$ reaches the head of the departure queue when $VC_i$ has the highest QOS and highest priority of all of the VC's in the departure queue. In that case, $VC_i$ transitions from the departure state 192 to a step 198 where $VC_i$ is removed from the departure queue. Following the step 198 is a step 200 where the head of the line cell (i.e., the oldest cell) corresponding to $VC_i$ is output by the bandwidth management system. Also at the step 200, the value of the backlog, $1_i$, is decremented by one and the credit variables, $c_i1$ and $c_i2$, are also decremented. Following the step 200 is a step 202 where the credit variables, $c_i1$ and $c_i2$, are updated. Updating the credit variables is discussed in more detail hereinafter. Following the step 202 is a step 204 where the value of $s_i$ is reset. Resetting the value of $s_i$ is discussed in more detail hereinafter. Following the step 204 is a step 206 where the variables $\bar{c}_i1$, $\bar{c}_i2$ and $\bar{P}_i$, are computed in a manner discussed in more detail hereinafter.

Following the step 206 is a test step 208 where the value of $s_i$ is examined. If the value of $s_i$ is not zero, then control transfers from the test step 208 to the step 166, discussed above, where the value of $s(t)$ is added to $s_i$ and where $VC_i$ is added to the eligibility queue.

If at the step 208 the value of $s_i$ is determined to be zero, then control passes from the step 208 to the test step 184, discussed above, where the backlog variable for $VC_i$, $1_i$, and the eligibility variable, $e_i$, are examined. If the backlog of $VC_i$ is at least one and if $VC_i$ is eligible, then control passes from the step 184 to the step 190, discussed above, where $VC_i$ is placed in the departure queue. Otherwise, if the backlog number of cells for $VC_i$ is not at least one or if $VC_i$ is not eligible, then control passes from the step 184 to the step 186, discussed above, where the value of $scd_i$ is set to zero. Following the step 186, $VC_i$ enters the unscheduled state 144. Note that, prior to transitioning to the step 184, it is possible to first run the cell admission check to determine if a cell has arrived since the last time the cell admission procedure has been run.

Figure 6:
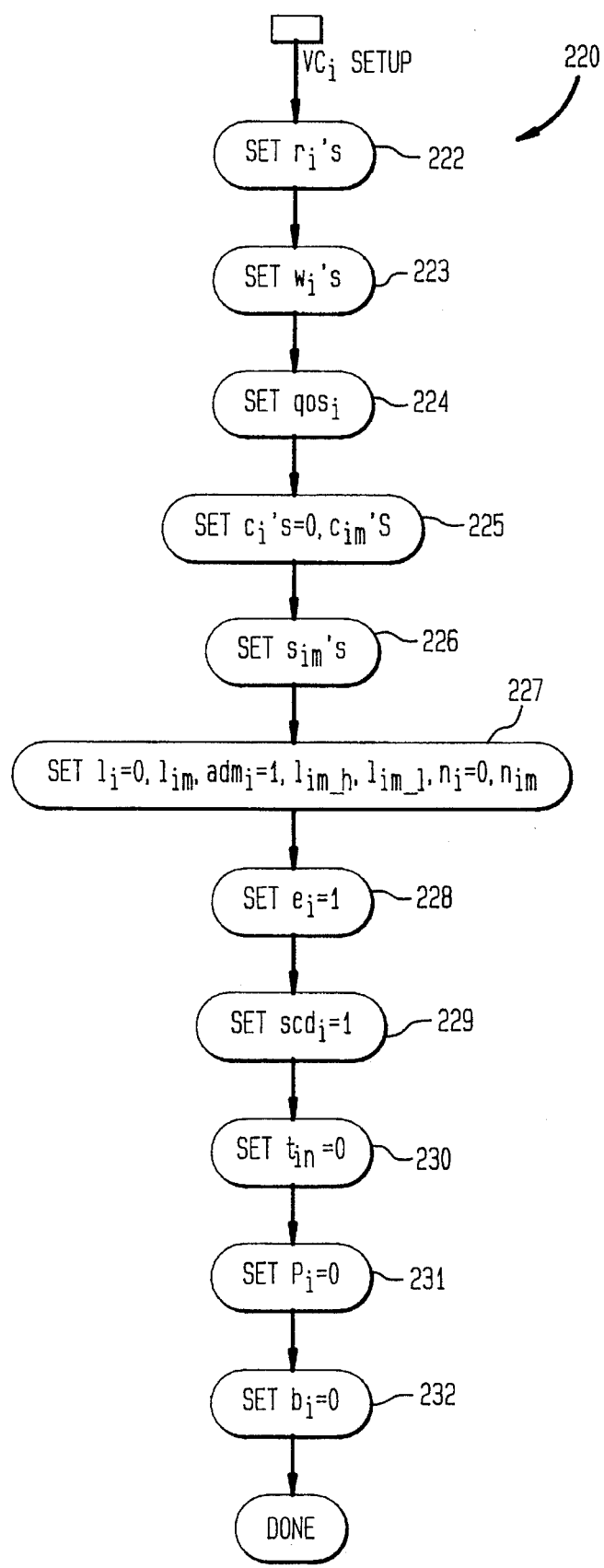
FIG. 6 is a state diagram illustrating setting up a virtual connection.

Referring to FIG. 6, a flow diagram 220 illustrates in detail the step 142 of FIG. 5 for setting up $VC_i$. At a first step 222, $r_1$ and $r_2$ are set. The variables $r_1$ and $r_2$ represent data transmission rates. The variables $r_1$ can represent the average data transmission rate for the virtual data connection. The variables $r_2$ can represent the burst transmission rate for the data connection. The burst transmission rate is the maximum bandwidth allowed for sending the data over the virtual connection, $VC_i$, by the requesting node. The system uses both the average rate and the burst rate in a manner described in more detail hereinafter.

Following the step 222 is a step 223 where the weights, $w_i1$–$w_i5$ are set. The weights are used in the calculation of the priority, $P_i$, in a manner which is described in more detail hereinafter.

Following the step 223 is a step 224 where the quality of service, $qos_i$, is set. The quality of service is provided by the sending node to the bandwidth management unit and depends upon the nature of the data being transmitted on the virtual connections, $VC_i$. The different possible values for $qos_i$ are discussed above.

Following the step 224 is a step 225 where $c_i1$ and $c_i2$ are set to zero and $c_{i\_m1}$ and $c_{i\_m2}$ are set. The variables $c_i1$ and $c_i2$ represent bandwidth credits that are allocated to $VC_i$. The credit variable $c_i1$ corresponds to the rate variable $r_i1$ and the credit variable $c_i1$ corresponds to the rate variable $r_i2$. The variable $c_{i\_m1}$ is the maximum value that the variable $c_i1$ is allowed to reach. The variable $c_{i\_m2}$ is the maximum value that the variable $c_i2$ is allowed to reach.

The credit variables represent the number of cell slots allocated to $VC_i$ during the operation of the bandwidth management unit. The credit variables are incremented whenever an amount of time has passed corresponding to the associated rate variable. For example, if $r_i1$ equals a rate corresponding to one hundred cells per second, than the credit variable $c_i1$ would be incremented once every one hundredth of a second. The credit mechanism controls the amount of bandwidth used by each of the VC's. Also, note that since $r_i1$ and $r_i2$ can be different, then the credit variables $c_i1$ and $c_i2$ can be incremented at different rates. Updating the credit variables is described in more detail hereinafter.

Following the step 225 is a step 226 where $S_{i\_m1}$ and $S_{i\_m2}$ are set. The variables $S_{i\_m1}$ and $S_{i\_m2}$ represent the maximum value that $s_i$ is allowed to reach. Following the step 226 is a step 227 where $1_i$, the backlog of cells for $VC_i$, is set to zero, and the variables $1_{i\_m}$, $1_{im\_1}$, and $1_{im\_h}$, which relate to $1_i$ in a manner discussed in more detail hereinafter, are all set to predetermined constant values that vary according to the traffic parameters provided when $VC_i$ is initialized. Also at the step 227, the variables $adm_i$, $n_i$, and $n_{im}$, which are discussed in more detail hereinafter, are also set.

Following the step 227 is a step 228 where the variable $e_i$, which determines whether $VC_i$ is enabled, is set to one, thus enabling $VC_i$, at least initially. Following the step 228 is a step 229 where the variable $scd_i$ is set to zero, thus indicating that $VC_i$ is initially in the unscheduled state.

Following the step 229 is a step 230 where the variable $t_{in}$ is set to zero. The variable $t_{in}$ indicates the value of the system time clock when the credit variables, $c_i1$ and $c_i2$, were most recently updated.

Following the step 230 is a step 231 where the priority valuable, $P_i$, is set to zero. Following the step 231 is a step 232 where the burst bit indicator, $b_i$ is initially set to zero.

Figure 7:
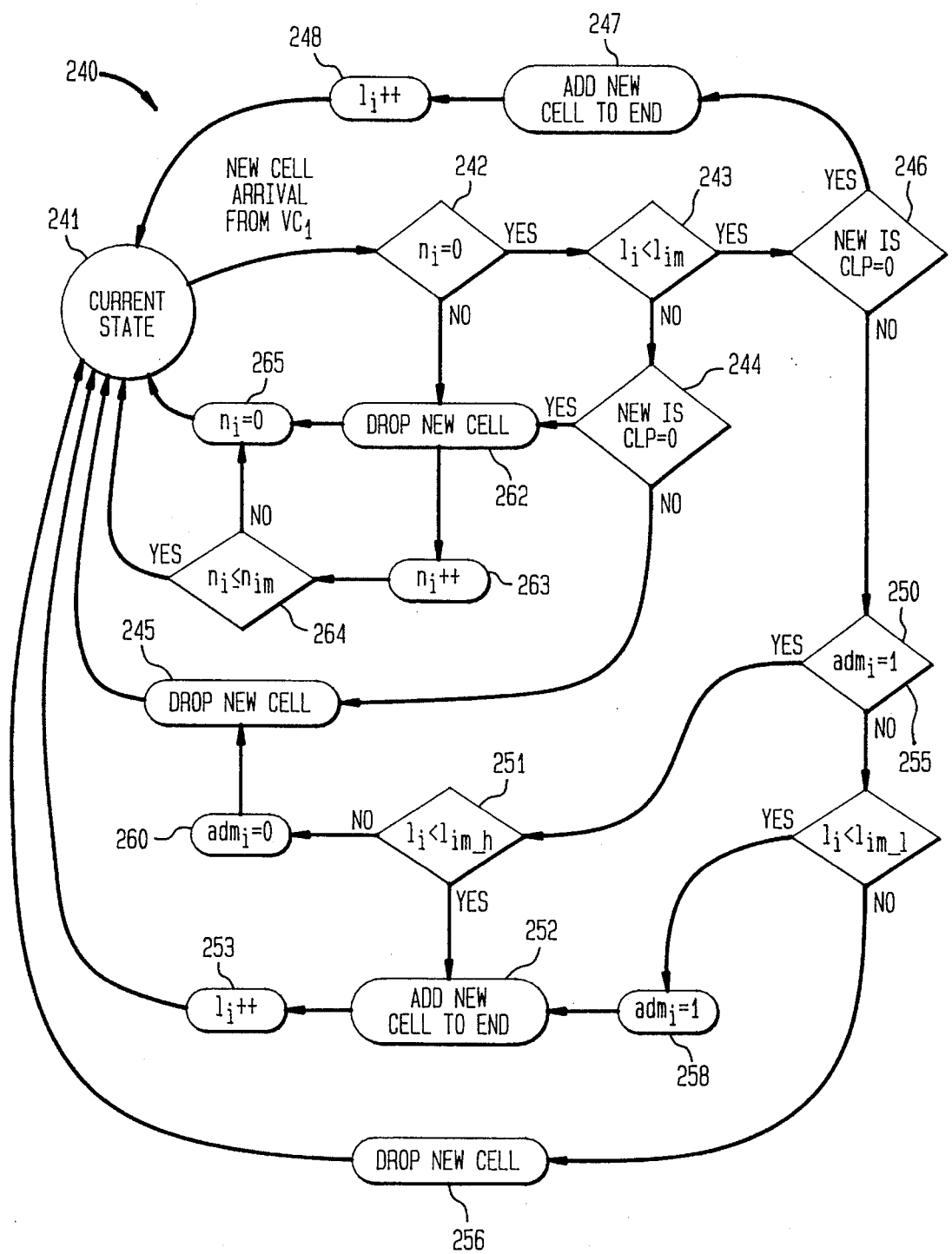
FIG. 7 is a flow diagram illustrating cell admission for a virtual connection.

Referring the FIG. 7, a diagram 240 illustrates in detail the cell admission step 146 of FIG. 5. The cell admission procedure shown in the diagram 240 is deemed "block mode" admission. Block mode admission involves potentially dropping a block of contiguous cells for a single VC in order to concentrate cell loss in that VC. That is, whenever a cell arrives for a VC having a full queue, the block mode admission algorithm drops that cell and may also drop a predetermined number of cells that follow the first dropped cell. The number of dropped cells is one of the initial traffic parameters provided when the VC is first established.

Processing for acceptance of cells begins at a current state 241 and transmission to a test step 242 when a new cell for $VC_i$ is provided to the bandwidth management unit by the data node. If $n_i$ equals zero at the test step 242, control transfers to another test step 243. If it is determined at the test step 243 that the number of backlog cells for $VC_i$, $l_i$, is not less than the maximum allowable backlog of cells, $l_{i\_m}$, then control transfers from the step 243 to a step 244 to determine if CLP equals zero. CLP is a variable indicating the cell loss priority of a cell. If a cell has a CLP of zero, that indicates that the cell is relatively less loss tolerant (i.e., the cell should not be discarded if possible). A cell having a CLP of other than zero is relatively more loss tolerant (i.e., could be discarded if necessary).

If CLP is not zero at the step 244, then control transfers to a step 245 where the newly arrived cell is discarded. Following the step 245, control transfer back to the current state 241. If it is determined at the test step 243 that the number of backlogged cells, $l_i$, is less than the maximum allowable number of backlogged cell $l_{i\_m}$, then control transfers from the step 243 to a step 246 to test if the value of CLP is zero.

If CLP equals zero at the step 246, then control transfers from the step 246 to a step 247 where the new cell is added to the cell buffer at the end of a queue of cells for $VC_i$. Following the step 247 is a step 248 where the variable representing the backlog cells for $VC_i$, $l_i$, is incremented. Following the step 248, control transfers back to the current state 241 of $VC_i$.

If at the step 246 it is determined that CLP for the cell does not equal zero, then control transfers from the step 246 to a step 250 where $adm_i$ is tested. The variable $adm_i$ is used to indicate which $l_{im}$ variable, $l_{im\_l}$, or $l_{im\_h}$, will be used. If at the test step 250 it is determined that $adm_i$ equals one, then control transfers from the step 250 to a test step 251 to determine if the number of backlog cells for $VC_i$, $l_i$, is less than the first backlog cell limit for $VC_i$, $l_{imh}$. If so, then control transfers from the step 251 to a step 252 where the new cell is added to the queue for $VC_i$. Following the step 252 is a step 253 where the variable indicating the number of backlogged cells, $l_i$ is incremented. Following the step 253, control transfers back to the current state 241.

If it is determined at the step 250 that $adm_i$ does not equal one, then control transfers from the step 250 to a step 255 where the number of backlogged cells for $VC_i$ is compared with the second limit for the number of backlog cells for $VC_i$, $l_{im\_l}$. If at the test step 255 it is determined that $l_i$ is not less than $l_{im\_l}$, then control transfers from the step 255 to a step 256 where the newly arrived cell is discarded. Following the step 256, control transfers back to the current state 241.

If at the test step 255 it is determined that the number of backlog cells for $VC_i$, $l_i$, is less than the limit variable $l_{im\_l}$, then control transfers from the step 255 to a step 258 where $adm_i$ is set to one. Following the step 258 is the step 252 where the new cell is added to the queue of cells for $VC_i$. Following the step 252, the variable representing the number of backlogged cells for $VC_i$, $l_i$, is incremented at the step 253. Following the step 253, control transfers back to current state 241.

If at the test step 251 it is determined that the number of backlog cells for $VC_i$ is not less than the limit variable $l_{im\_h}$, then control transfers from the step 251 to a step 260 where $adm_i$ is set to zero. Following the step 260 is the step 245 where the newly arrived cell is discarded. Following the step 245, control transfers back to the current state 241.

If at the test step 242 it is determined that $n_i$ does not equal zero, or if CLP does equal zero at the step 244, then control transfers to a step 262, where the newly arrived cell is discarded. Following the step 262 is a step 263 where $n_i$ is incremented. Following the step 263 is a test step 264, where $n_i$ is compared to the limit for $n_i$, $n_{im}$. If at the step 264 $n_i$ is less than or equal to $n_{im}$, control transfers from the step 264 back to the current state 241. Otherwise, control transfers to step 265, where $n_i$ is set to zero. Following the step 265, control transfers back to the current state 241.

Figure 8:
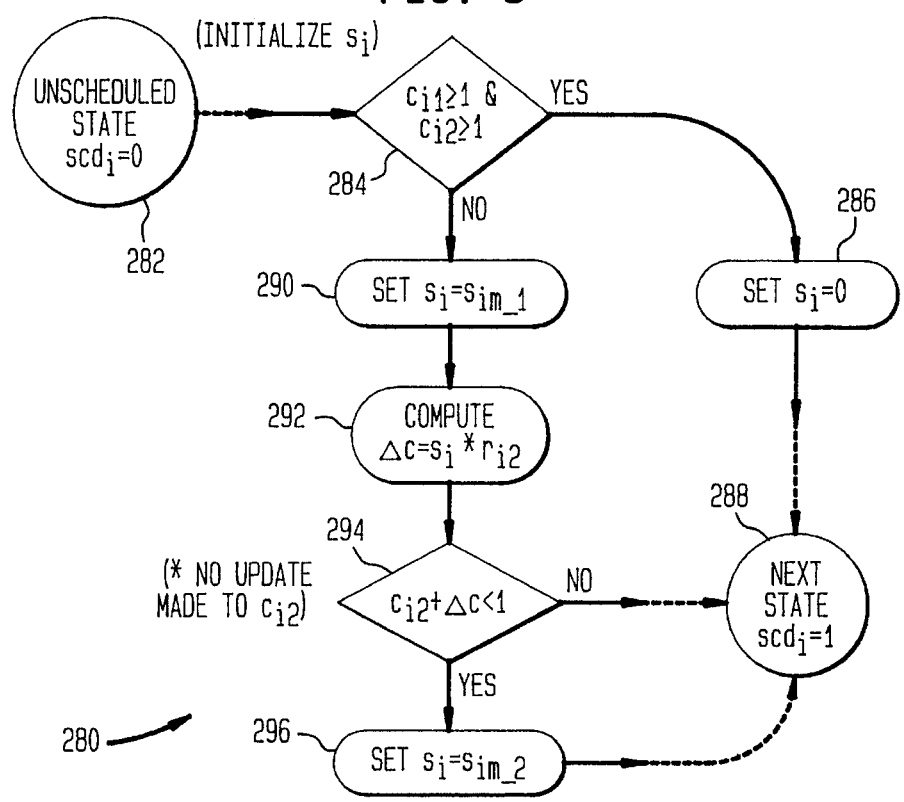
FIG. 8 is a flow diagram illustrating initializing the value of an eligibility timer for a virtual connection.

Referring to FIG. 8, a flow diagram 280 illustrates the step 160 of FIG. 5 where the value of $s_i$ is initialized. Flow begins when $VC_i$ is in the unscheduled state 282. At a first test step 284, the values of $c_i1$ and $c_i2$ are examined. The variable $c_i1$ and $c_i2$ represent the credits for $VC_i$. If the values of both of the credit variables, $c_i1$ and $c_i2$, are greater than or equal to one, then control passes from the test step 284 to a step 286 where the value of $s_i$ is set to zero. Following the step 286, $VC_i$ enters a next state 288. Note that, if $s_i$ is set to zero at the step 286, then the next state 288 is the departure state 192, as shown on FIG. 5. This occurs because at the test step 164 of FIG. 5, the value of $s_i$ is checked to see if $s_i$ equals zero. If so, then $VC_i$ goes from the unscheduled state 144 directly to the departure state 192, as shown in FIG. 5 and as described above.

If at the test step 284 it is determined that either $c_i1$ or $c_i2$ is less than one, then control transfers from the step 284 to a step 290 where $s_i$ is set to $s_{i\_m1}$. The variable $s_{i\_m1}$, is a variable that represents the amount of time between cell transmissions for cells transmitted at a rate $r_i1$.

Following the step 290 is a step 292 where $\Delta c$ is computed. The variable $\Delta c$ represents the amount of additional credit that will be added to $c_i2$ after an amount of time corresponding to $s_i$ has passed. The value of $\Delta c$ is computed by multiplying $s_i$ by $r_i2$.

Following the step 292 is a test step 294 which determines if the existing value of the credit variable, $c_i2$, plus the value of $\Delta c$, is less than one. Note that the variable $c_i2$ is not updated at this step. If the sum of $c_i2$ and $\Delta c$ is not less than one, then control transfers from the step 294 to the next state 288. Note that, in this case, the next state will be the eligibility state 168 shown in FIG. 5 because $s_i$ will not equal zero at the step 164 of FIG. 5.

If the sum of $c_i2$ and $\Delta c$ is less than one at the step 294, then control transfers from this step 294 to a step 296 where the value of $s_i$ is set to $s_{i\_m2}$. The variable $s_{i\_m2}$ represents the amount of time between cell transmissions for cells transmitted at a rate $r_i2$. Following the step 296, control transfers to the next state 288, discussed above.

Figure 9:
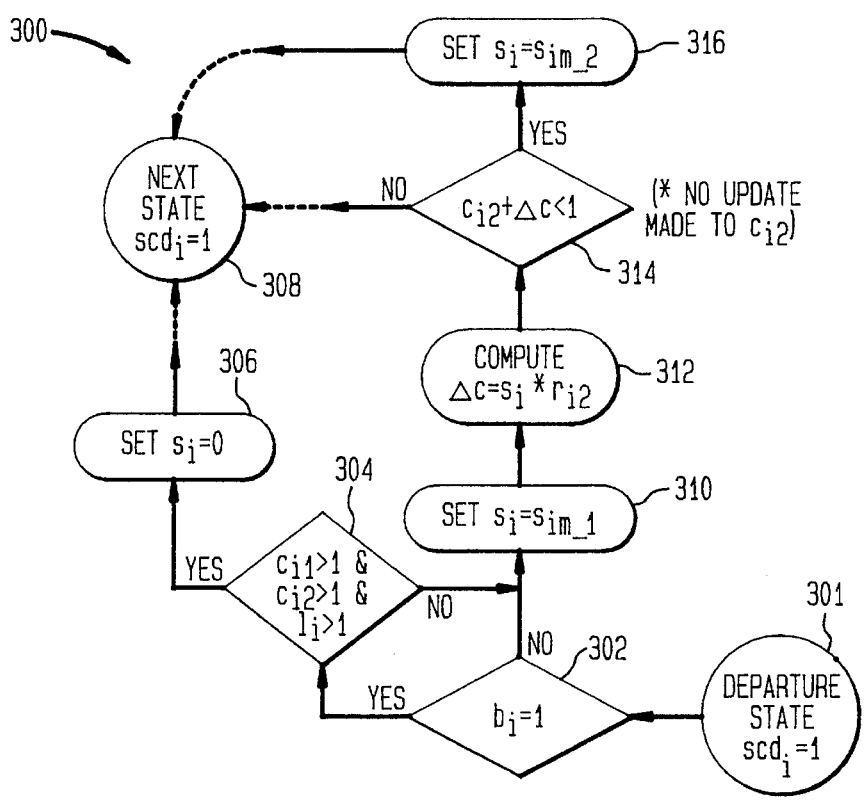
FIG. 9 is a flow diagram illustrating resetting the value of an eligibility timer for a virtual connection.

Referring to FIG. 9, a flow diagram 300 illustrates the reset $s_i$ value step 204 shown in FIG. 5. At a first test step 302, the burst bit variable for $VC_i$, $b_i$, is tested. The burst bit variable, $b_i$, indicates that $VC_i$ should transmit in burst mode. Burst mode is used for a virtual connection where the cells of a virtual connection should be transmitted as close together as possible. That is, the data node sets the virtual connection for burst mode for data traffic that should be transmitted as close together as possible. For example, although an e-mail message may have a low priority, it may be advantageous to transmit the entire e-mail message once the first cell of the e-mail message has been sent.

If the burst bit for $VC_i$, $b_i$, is determined to be set at the step 302, control passes from the test step 302 to a test step 304 where the credit variables, $c_i1$ and $c_i2$, and the backlog variable, $1_i$, for $VC_i$ are tested. If the credit variables and the backlog are all greater than or equal to one at the step 304, then control passes from the step 304 to a step 306 where $s_i$ is set to zero. Following step 306, $VC_i$ enters the next state 308. Note that, since $s_i$ is set to zero at the step 306, the next state for $VC_i$ will be the departure state 192 shown in FIG. 5.

If the burst bit indicator, $b_i$, is set at the step 302 but $VC_i$ does not have enough bandwidth credits or the backlog $1_i$ is zero at the step 304, then control passes from the step 304 to a step 310 where $s_i$ is set equal to $s_{i\_m1}$. Note that the step 310 is also reached if it is determined at the test step 302 that the burst bit indicator, $b_i$ does not equal one (i.e., $VC_i$ is not transmitting in burst mode).

Following the step 310 is a step 312 where $\Delta c$ is computed in a manner similar to that illustrated in connection with the step 292 of FIG. 8. Following the step 312 is a step 314 where it is determined if sum of the credit variable $c_i2$ and $\Delta c$ is less than one. If not, then control passes from the step 314 to the next state 308. The test step 314 determines if the credit variable $c_i2$ will be greater than one after an amount of time corresponding to $s_i$ has passed (i.e., after the $s_i$ counter has timed out). If not, then $c_i2$ plus $\Delta c$ will be less than one when $s_i$ times out and control transfers from the step 314 to a step 316 where $s_i$ is set equal to $s_{i\_m2}$. Following the step 316, $VC_i$ enters the next state 308.

Figure 10:
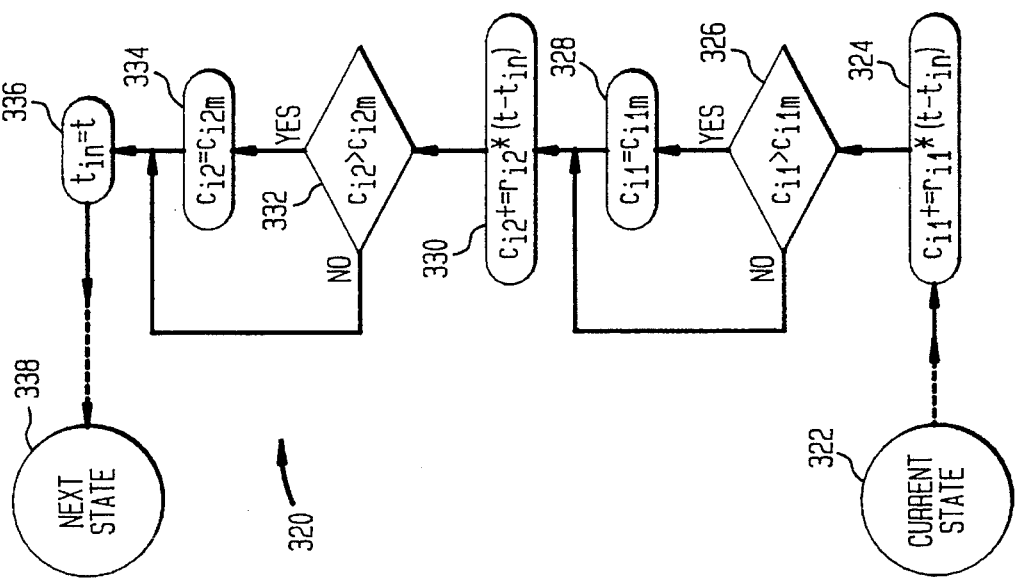
FIG. 10 is a flow diagram illustrating updating credit variables of a virtual connection.

Referring to FIG. 10, a flow diagram 320 illustrates the steps for updating and $c_i2$, the credit variables for $VC_i$. Updating $c_i1$ and $c_i2$ occurs at the step 158 and the step 202 shown in FIG. 5, discussed above. Note that the credit variables are set according to current system time but that, for the step 202 of FIG. 5, the time used is the beginning of the next cell time slot in order to account for the amount of time it takes to transmit a cell at the steps preceding the step 202.

Processing begins at a current state 322 which is followed by a step 324 where a value for $c_i1$ is computed. At the step 324, $c_i1$ is increased by an amount equal to the product of $r_i1$ (one of the rate variables for $VC_i$) and the differences between the current system time, t, and the time at which the credit variables, $c_i1$ and $c_i2$, were last updated, $t_{i\_n}$. Following the step 324 is a test step 326 to determine if $c_i1$ is greater than $c_{i1m}$. The variable $c_{i1m}$ is the maximum value that the credit variable $c_i1$ is allowed to equal and is set up at the time $VC_i$ is initialized. If at the test step 326 $c_i1$ is greater than $c_{i1m}$, then control transfers from the step 326 to a step 328 where $c_i1$ is set equal to $c_{i1m}$. The steps 326, 328 effectively set $c_i1$ to the maximum of either $c_i1$ or $c_{i1m}$.

Following the step 328 or the step 326 if $c_i1$ is not greater than $c_{i1m}$ is a step 330 where a value for $c_i2$ is computed in a manner similar to the computation of $c_i1$ at the step 324. Following the step 330 are steps 332, 334 which set $c_i2$ to the maximum of either $c_i2$ or $c_{i2m}$ in a manner similar to the steps 326, 328 where $c_i1$ is set equal to the maximum of $c_i1$ and $c_{i1m}$.

Following the step 334, or the step 332 if $c_i2$ is not greater than $c_{i2m}$, is a step 336 where $t_{in}$ is set equal to t, the current system time. The variable $t_{in}$ represents the value of the system time, t, when the credit variables, $c_i1$ and $c_i2$, were last updated. Following the steps 336 is a step 338 where the $VC_i$ enters the next appropriate state.

Figure 11:
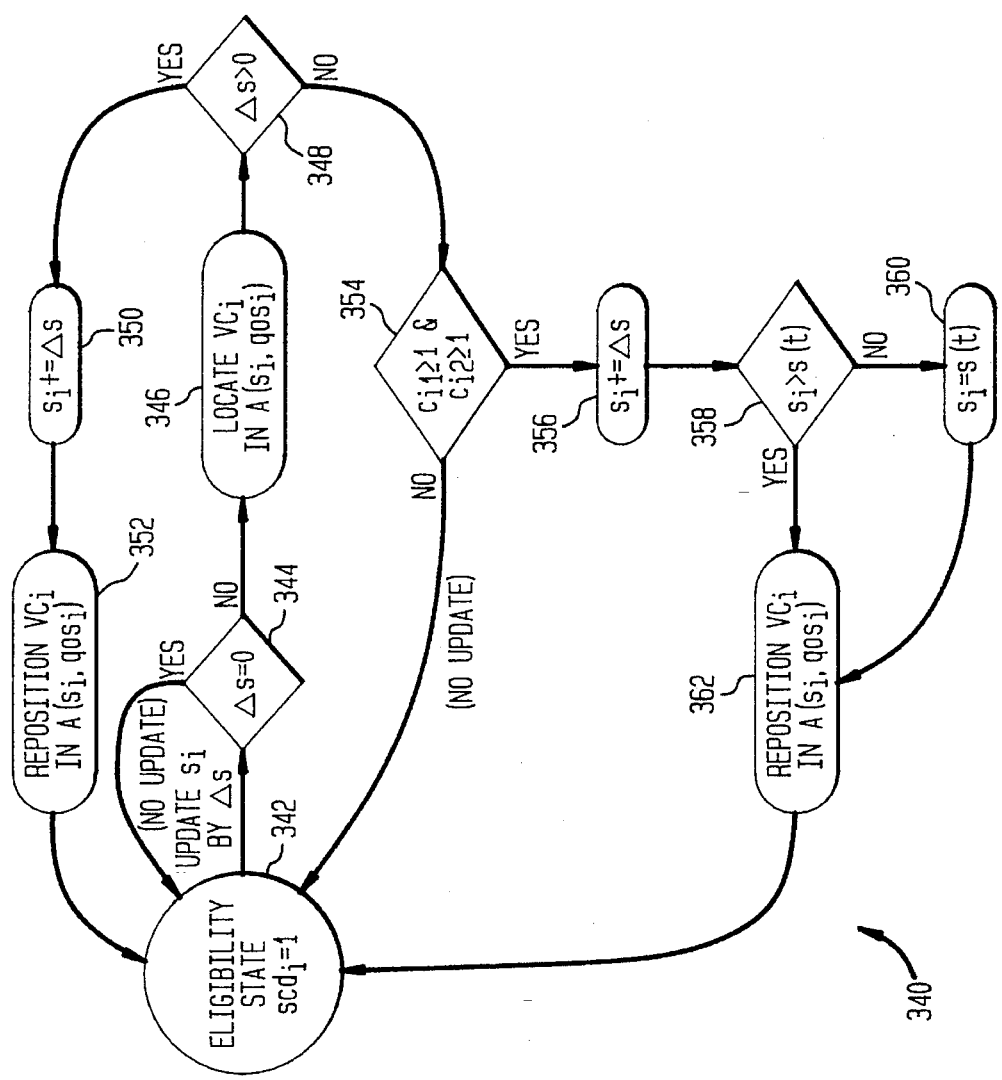
FIG. 11 is a flow diagram illustrating updating an eligibility timer of a virtual connection.

Referring to FIG. 11, a flow diagram 340 illustrates the step 174 of FIG. 5 where $s_i$ is updated by $\Delta s$. The step 174 of FIG. 5 is executed whenever the data node associated with the bandwidth management unit requests changing the delay of sending data via $VC_i$ by changing the value of $s_i$ for $VC_i$.

Processing begins with $VC_i$ in an eligibility state 342. When the data source node provides $VC_i$ with a command to update $s_i$, control transfers from the step 342 to a test step 344 to determine if the value of $\Delta s$, provided by the associated data node, equals zero. If so, control transfers from the step 344 back to the eligibility state 342 and no processing occurs. Otherwise, if as does not equal zero, then control transfers from the test step 344 to a step 346 where $VC_i$ is located in the eligibility queue. Note that, as shown in FIG. 5, the step 174 where $s_i$ is updated only occurs when $VC_i$ is in the eligibility state.

Following the step 346 is a test step 348 where it is determined if as is greater than zero or less than zero. If $\Delta s$ is greater than 0, then control transfers from the step 348 to a step 350 where $\Delta s$ is added to $s_i$. Following the step 350 is a step 352 where $VC_i$ is repositioned in the eligibility queue according to the new value of $s_i$. Note that, as discussed above in connection with FIG. 5, the position of $VC_i$ in the eligibility queue is a function of the values of $s_i$ and $qos_i$.

If at the test step 348 it is determined that as is less than zero, then control transfers from the step 348 to a step 354 where the credit variables, $c_i1$ and $c_i2$, are examined. If at the test step 354 it is determined that either $c_i1$ or $c_i2$ is less than one, then control transfers from the step 354 back to the eligibility state 342 and no update of $s_i$ is performed. The steps 348, 354 indicate that the value of $s_i$ is not decreased if either of the credit variables is less than one.

If at the step 354 it is determined that the credit variables, $c_i1$ and $c_i2$, are both greater than or equal to one, then control transfers from the step 354 to a step 356 where the value of $s_i$ is incremented by the amount as. Note that, in order to reach the step 356, $\Delta s$ must be less than zero so that at the step 356, the value of $s_i$ is in fact decreased.

Following the step 356 is a step 358 where the value of $s_i$ is compared to s(t). If the value of $s_i$ has been decreased at the step 356 by an amount that would make $s_i$ less than s(t) then control transfers from the step 358 to a step 360 where $s_i$ is set equal to s(t). The steps 358, 360 serve to set the value of $s_i$ to the greater of either $s_i$ or s(t).

Following the step 360 or following the step 358 if $s_i$ is greater than or equal to s(t), control transfers to a step 362 where $VC_i$ is repositioned in the eligibility queue. As discussed above, the position of $VC_i$ in the eligibility queue is a function of the values of $s_i$ and $qos_i$. Following the step 362, $VC_i$ returns to the eligibility stage 342.

Figure 12:
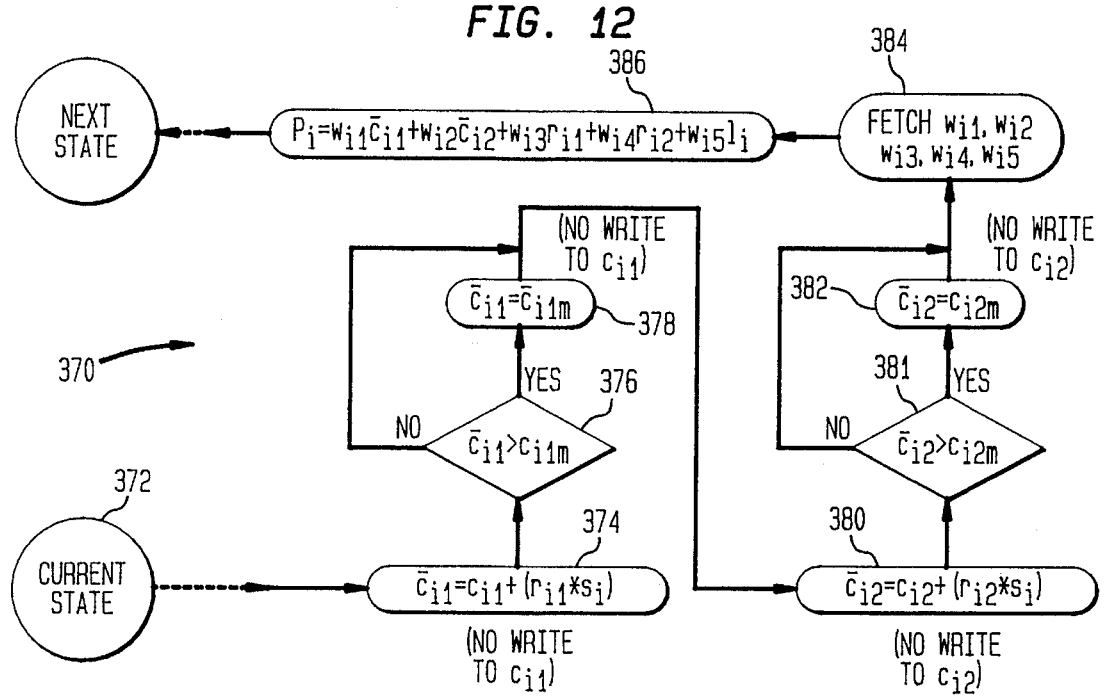
FIG. 12 is a flow diagram illustrating computing values for credit variables and a priority variable for a virtual connection.

Referring to FIG. 12, a flow diagram 370 illustrates the compute steps 162, 206 of FIG. 5 where the values of $\bar{c}_i 1$, $\bar{c}_i 2$, and $P_i$ are computed. Processing begins at a current state 372 which is followed by a step 374 where the value of $\bar{c}_i 1$ is computed. The value of $\bar{c}_i 1$ equals the value that the credit variables will have when $s_i$ times out. That is, $\bar{c}_i 1$ equals the future value of the credit variables $c_i 1$ when $VC_i$ is removed from the eligibility queue. Since, as discussed in more detail hereinafter, $P_i$ is a function of the credit variables, $c_i 1$ and $c_i 2$, then calculating the future values of $c_i 1$ and $c_i 2$ is useful for anticipating the value of $P_i$ when $VC_i$ is removed from the eligibility queue and placed in the departure queue.

The value of the priority variable, $P_i$, is determined using the following equation:

$$P_i = w_i 1 * c_i 1 + w_i 2 * c_i 2 + w_i 3 * r_i 1 + w_i 4 * r_i 2 + w_i 5 * 1_i$$

$P_i$ is a function of the credit variables, the rate variables, and the number of cells backlogged in the queue. The node requesting initialization of $VC_i$ specifies the weights, $w_i 1$–$w_i 5$, for the VC. Accordingly, it is possible for the requesting node to weight the terms differently, depending upon the application. For example, if the data is relatively bursty, then perhaps $w_i 2$ and $w_i 4$ (the weights for the terms corresponding to the burst data rate) are made larger than $w_i 1$ and $w_i 3$ (the weights for the terms corresponding to the average data rate). Similarly, if it is desirable to minimize the backlog for the data, then $w_i 5$ (the weight corresponding to the number of backlogged cells) may be made relatively large. It may be desirable for some applications to assign zero to some of the weights.

At the step 374, the value of $\bar{c}_i 1$ is calculated by adding the current value of the credit variables $c_i 1$ and the product of $r_i 1$ and $s_i$. Note that, if the credit variables were updated for each iteration while $VC_i$ was in the eligibility queue, then $c_i 1$ would equal $c_i 1$ when $s_i$ equalled zero. Note that $c_i 1$ is not updated at the step 374.

Following the step 374 is a test step 376 where $\bar{c}_i 1$ is compared to $c_{i1\_m}$. If $\bar{c}_i 1$ is greater than $c_i 1 + di$ —m (the maximum value that $c_i 1$ is allowed to take on) then control transfers from the test step 376 to a step 378 where the value of $\bar{c}_i 1$ is set equal to the value of $c_{i1\_m}$. The steps 376, 378 serve to set the value of $\bar{c}_i 1$ to the maximum of $\bar{c}i1$ and $c_{i1\_m}$. Note that for the steps 376, 378, $c_i 1$ is not updated.

Following the step 378 or following the step 376 if $\bar{c}_i 1$ is not greater than $c_{i1\_m}$ are steps 380–382, which set the value of $\bar{c}_i 2$ in a manner similar to setting the value of $\bar{c}_i 1$, described above.

Following the step 382 or following the step 381 if $\bar{c}_i 2$ is not greater than $c_{i2\_m}$ is a step 384 where the weights $w_i 1$, $w_i 2$, $w_i 3$, $w_i 4$, and $w_i 5$ are fetched. As discussed above, the weights are used to calculate the priority, $P_i$.

Following the step 384 is a step 386 where the priority for $VC_i$, $P_i$, is calculated in the manner shown on the flow diagram 370. Note that the weights are specified at the time that $VC_i$ is initialized and that the importance of each of the terms used in the calculations of $P_i$, can be emphasized or deemphasized by setting the value of the weights. The values of one or more of the weights can be set to zero, thus causing a term not to be used in the calculation of the priority. Note that $P_i$ is updated, $P = P_i + w_i 5$, after each $VC_i$ cell admission while $VC_i$ is in the eligibility state, as discussed above. This allows for a piecewise computation of $P_i$ that decreases the amount of computation required to compute all of the priorities for all of the VC's within one time slot when the VC's are transferred to the departure queue (the "B" queue).

Figure 13:
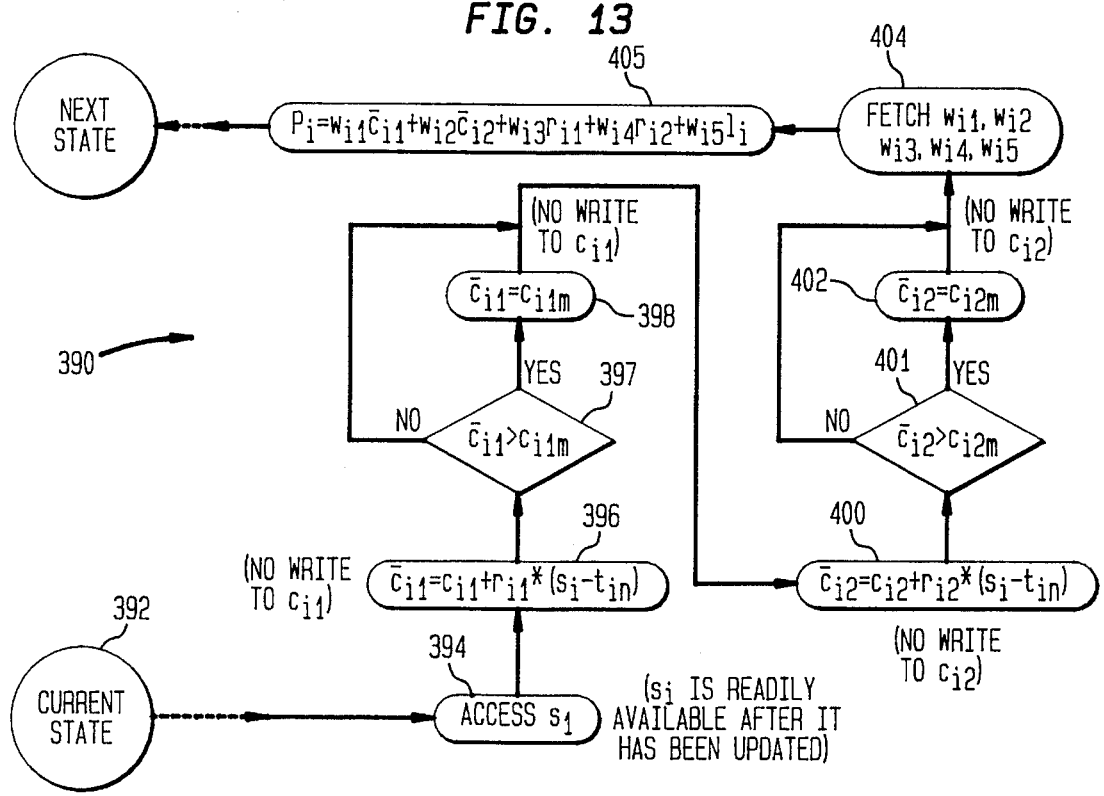
FIG. 13 is a flow diagram illustrating updating a priority variable for virtual connection.

Referring to FIG. 13, a flow diagram 390 illustrates in detail the step 180 of FIG. 5 where the priority variable, $P_i$, is updated. Note that $P_i$ is updated only in response to the value of $s_i$ being updated at the step 174. Otherwise, the value of $P_i$ remains constant while $VC_i$ is in the eligibility state. That is, since $P_i$ is a function of $c_i 1$, $c_i 2$, $r_i 1$, $r_i 2$ and $1_i$, and since $c_i 1$ and $c_i 2$ are a function of $s_i$, then $P_i$ only changes when and if $s_i$ changes at the step 174 shown in FIG. 5.

Flow begins at a current state 392 which is followed by a step 394 where $s_i$ is accessed. Following the step 394 are steps 396–398 where $\bar{c}_i 1$ is computed in a manner similar to that illustrated in FIG. 12. Note, however, that at the step 396, $t_{in}$ is subtracted from $s_i$ since, at this stage of the processing, $s(t)$ has already been added to $s_i$ at the step 166 shown in FIG. 5, and since $\bar{c}_i 1$ is being predicted when $s_i$ times out.

Following the step 398 are steps 400–402 where $\bar{c}_i 2$ is computed in a manner similar to the computation of $\bar{c}_i 1$. Following the step 402 or following the step 401 if $\bar{c}_i 2$ is not greater than $c_{i2\_m}$ are the steps 404, 405 where the weights are fetched and $P_i$ is computed in a manner similar to that illustrated in connection with FIG. 12, described above.

Figure 14:
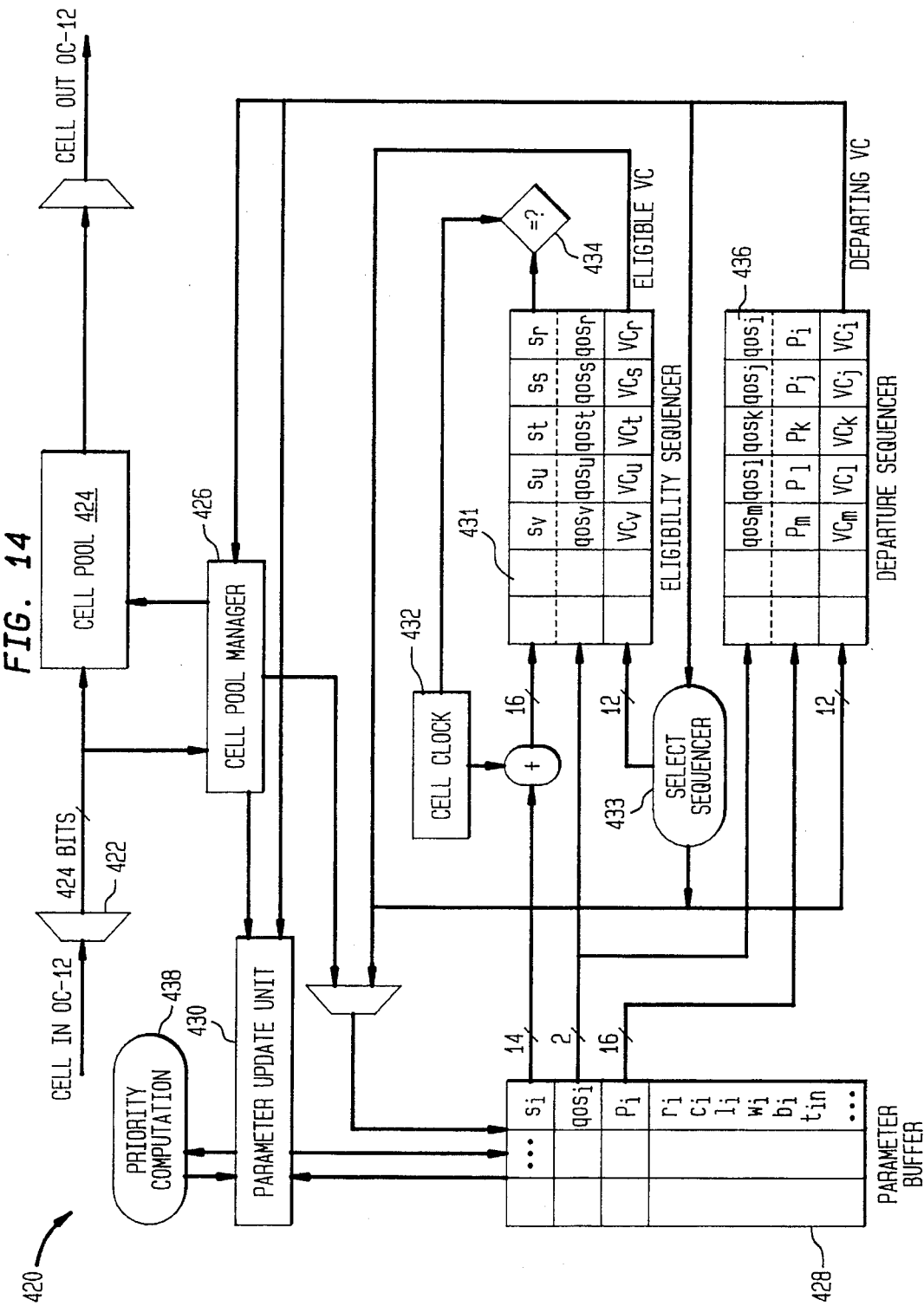
FIG. 14 is a schematic diagram illustrating hardware implementation of a bandwidth management unit.

Referring to FIG. 14, a schematic diagram 420 illustrates in detail one possible hardware implementation for the bandwidth management unit. An input 422 connects the bandwidth management unit 420 to the source of the data cells. The input 422 is connected to a cell pool 424 which is implemented using memory. The cell pool 424 stores all of the cells waiting for departure from the bandwidth management unit. In the embodiment illustrated herein, the size of the cell pool 424 equals the number of VC's that the system can accommodate multiplied by the maximum allowable backlog per VC. For example, for a bandwidth management unit designed to handle 4,096 VC's with a maximum backlog length of 30 cells, the size of the cell pool is 4096×30 cells.

A cell pool manager 426 handles the cells within the bandwidth management unit 420 in a manner described above in connection with the state diagrams of FIGS. 5–13.

A parameter buffer 428 is used to handle all of the variables associated with each of the VC's and is implemented using memory. The size of the parameter buffer 428 is the number of variables per VC multiplied by the maximum number of VC's handled by the bandwidth management unit 420.

A parameter update unit 430 is connected to the parameter buffer 428 and updates the variables for each of the VC's in a manner described above in connection with the state diagrams of FIGS. 5–13.

A cell clock 432 computes the value of s(t) which, as described above, is used for determining when a VC transitions from the eligibility queue to the departure queue. The cell clock 432 also provides the system time, t.

An eligibility queue 431 is implemented using memory and stores the VC's that are in the eligibility state. As discussed above in connection with FIGS. 5–13, VC's in the eligibility queue are sorted in order of the values of s and qos for each VC.

A comparator 434 compares the value of s(t) from the eligibility cell clock 432 with the value of s for each of the VC's and determines when a VC should transition from the eligibility state to the departure state. Note that, as discussed above in connection with FIGS. 5–13, $VC_i$ transitions from the eligibility state to the departure state when $s_i \geq s(t)$.

A departure queue 436 is implemented using memory and stores the VC's that are awaiting departure from the bandwidth management unit 420. As discussed above in connection with FIGS. 5–13, the departure queue 436 contains VC's that are sorted in order of quality of service (qos) for each VC and the priority that is computed for each VC. A select sequencer unit 433 selects, for each VC, which of the two queues 431, 436 to place each VC according to the algorithm described above and shown in FIGS. 5–13.

A priority computation unit 438 computes the priority for each of the VC's during each iteration. Note that, as discussed above in connection with FIGS. 5–13, once a VC has entered the eligibility queue, the priority can be updated by simply summing the value of the priority variable and the product of the weight $w_5$ after each cell arrival is admitted.

The device 420 shown in FIG. 14 can be implemented in a straightforward manner using conventional VLSI architecture. The cell pool 424, eligibility queue 431, departure queue 436, and parameter buffer 428 can be implemented as memories. The cell pool manager 426, the parameter update unit 430, the select sequencer 433, the priority computation unit 438 and the comparator 434 can be implemented using VLSI logic to implement the functionality described above in connection with FIGS. 5–13. That is, one of ordinary skill in the art can implement the bandwidth management unit 420 by using the state diagrams and current custom VLSI design techniques. Note also that, based on the description contained herein, one of ordinary skill in the art could implement the bandwidth management unit 420 in a variety of other manners, including entirely as software on a very fast processor or as a conventional combination of hardware and software.

Although the invention has been shown and described with respect to exemplary embodiments thereof, it should be understood by those skilled in the art that various changes, omissions and additions may be made therein and thereto, without departing from the spirit and the scope of the invention.

What is claimed is:

1. A bandwidth management system, for managing a plurality of virtual data connections within a communications network, comprising:

an input for receiving data cells, wherein each cell is associated with a particular one of the virtual connections;

a cell pool, coupled to said input, for storing said cells;

a first queue containing particular ones of the virtual connections, wherein a relative position of a virtual connection in said first queue is determined by an eligibility value that varies according to an anticipated data rate associated with the particular virtual connection and according to an amount of time that the particular virtual connection has been in said first queue;

a second queue, coupled to said first queue and containing particular other ones of the virtual connections, wherein a relative position of a virtual connection in said second queue varies according to a predetermined quality of service that is assigned to each of the virtual connections; and an output, coupled to said second queue and said cell pool, for transmitting a cell from said cell pool corresponding to a virtual connection at the front of said second queue.

2. A bandwidth management system, according to claim 1, wherein virtual connections having equal eligibility values are ordered in said first queue according to said predetermined quality of service.

3. A bandwidth management system, according to claim 1, wherein virtual connections having equal quality of service values are ordered in said second queue according to a priority assigned to each of said virtual connections.

4. A bandwidth management system, according to claim 3, wherein said priority varies according to one or more anticipated data rates of each of the virtual connections.

5. A bandwidth management system, according to claim 3, wherein said priority varies according to one or more credit variables assigned to each of the virtual connections, said credit variables being indicative of allocated time slots provided to each of the virtual connections.

6. A bandwidth management system, according to claim 3, wherein said priority varies according to a backlog of cells for each virtual connection that are awaiting transmission.

7. A bandwidth management system, according to claim 3, wherein said priority varies according to one or more anticipated data rates of each of the virtual connections, one or more credit variables assigned to each of the virtual connections, said credit variables being indicative of allocated time slots provided to each of the virtual connections, and to a backlog of cells for each virtual connection that are awaiting transmission.

8. A bandwidth management system, according to claim 7, wherein said data rates, said credit variables, and said backlog are weighted prior to determining said priority.

9. A bandwidth management system, according to claim 1, wherein said system is one of: a pacing unit and an enforcement unit, wherein said pacing unit receives cells from a data source node and provides cells to a communication link, and wherein an enforcement unit receives data from a communication link and provides data to a data sink node.

10. A bandwidth management system, according to claim 1, further comprising:

means for establishing a virtual connection by specifying initial traffic parameters; and means for dropping cells that are received at a rate that exceeds that specified by said initial traffic parameters.

11. A bandwidth management system, according to claim 1, wherein said predetermined quality of service has four possible values.

12. A bandwidth management system, according to claim 11, wherein virtual connections having equal quality of service values are ordered in said second queue according to a priority assigned to each of said virtual connections.

13. A bandwidth management system, according to claim 12, wherein said priority varies according to one or more anticipated data rates of each of the virtual connections, one or more credit variables assigned to each of the virtual connections, said credit variables being indicative of allocated time slots provided to each of the virtual connections, and to a backlog of cells for each virtual connection that are awaiting transmission.

14. A bandwidth management system, according to claim 13, wherein said data rates, said credit variables, and said backlog are weighted prior to determining said priority.

15. A bandwidth management system, according to claim 1, further comprising:

a burst indicator for indicating whether a virtual connection associated with a cell that has been received by said input should be placed directly in said second queue.

16. A bandwidth management system, according to claim 15, wherein virtual connections having equal quality of service values are ordered in said second queue according to a priority assigned to each of said virtual connections.

17. A bandwidth management system, according to claim 16, wherein said priority varies according to one or more anticipated data rates of each of the virtual connections, one or more credit variables assigned to each of the virtual connections, said credit variables being indicative of allocated time slots provided to each of the virtual connections, and to a backlog of cells for each virtual connection that are awaiting transmission.

18. A bandwidth management system, according to claim 17, wherein said data rates, said credit variables, and said backlog are weighted prior to determining said priority.

19. A method of managing a plurality of virtual data connections within a communications network, comprising the steps of:

receiving data cells, wherein each cell is associated with a particular one of the virtual connections;

storing the received cells in a cell pool;

providing a first queue containing particular ones of the virtual connections, wherein a relative position of a virtual connection in the first queue is determined by an eligibility value that varies according to an anticipated data rate associated with the particular virtual connection and according to an amount of time that the particular virtual connection has been in the first queue;

providing a second queue, coupled to the first queue and containing particular other ones of the virtual connections, wherein a relative position of a virtual connection in the second queue varies according to a predetermined quality of service that is assigned to each of the virtual connections; and transmitting a cell from the cell pool corresponding to a virtual connection at the front of the second queue.

20. A method, according to claim 19, further comprising the step of:

ordering virtual connections having equal eligibility values in the first queue according to the predetermined quality of service.

21. A method, according to claim 19, further comprising the step of:

ordering virtual connections having equal quality of service values in the second queue according to a priority assigned to each of the virtual connections.

22. A method, according to claim 21, further including the step of:

varying the priority according to one or more anticipated data rates of each of the virtual connections.

23. A method, according to claim 21, further including the step of:

varying the priority according to one or more credit variables assigned to each of the virtual connections, wherein the credit variables are indicative of allocated time slots provided to each of the virtual connections.

24. A method, according to claim 21, further including the step of:

varying the priority according to a backlog of cells, for each virtual connection, that are awaiting transmission.

25. A method, according to claim 21, further including the step of:

varying the priority according to one or more anticipated data rates of each of the virtual connections, one or more credit variables assigned to each of the virtual connections, wherein the credit variables are indicative of allocated time slots provided to each of the virtual connections, and according to a backlog of cells, for each virtual connection, that are awaiting transmission.

26. A method, according to claim 25, further including the step of:

varying the priority according to weights assigned to the data rates, the credit variables, and the backlog.

27. A method, according to claim 19, further comprising the steps of establishing a virtual connection by specifying initial traffic parameters; and dropping cells that are received at a rate that exceeds that specified by the initial traffic parameters.

28. A method, according to claim 19, further including the step of:

assigning one of four possible values the predetermined quality of service.

29. A method, according to claim 28, further comprising the step of:

ordering virtual connections having equal quality of service values in the second queue according to a priority assigned to each of the virtual connections.

30. A method, according to claim 29, further including the step of:

varying the priority according to one or more anticipated data rates of each of the virtual connections, one or more credit variables assigned to each of the virtual connections, wherein the credit variables are indicative of allocated time slots provided to each of the virtual connections, and according to a backlog of cells, for each virtual connection, that are awaiting transmission.

31. A method, according to claim 30, further including the step of:

varying the priority according to weights assigned to the data rates, the credit variables, and the backlog.

32. A method, according to claim 19, further comprising the step of:

placing a virtual connection associated with an admitted cell directly on the second queue in response to a burst indicator for the virtual connection being set.

33. A method, according to claim 32, further comprising the step of:

ordering virtual connections having equal quality of service values in the second queue according to a priority assigned to each of the virtual connections.

34. A method, according to claim 33, further including the step of:

varying the priority according to one or more anticipated data rates of each of the virtual connections, one or more credit variables assigned to each of the virtual connections, wherein the credit variables are indicative of allocated time slots provided to each of the virtual connections, and according to a backlog of cells, for each virtual connection, that are awaiting transmission.

35. A method, according to claim 34, further including the step of:

varying the priority according to weights assigned to the data rates, the credit variables, and the backlog.

* * * * *